United States Patent
Kim et al.

(10) Patent No.: US 12,162,774 B2
(45) Date of Patent: Dec. 10, 2024

(54) METHOD OF PREPARING LITHIUM COMPOUND

(71) Applicants: POSCO, Pohang-si (KR); Research Institute of Industrial Science & Technology, Pohang-si (KR)

(72) Inventors: Juyoung Kim, Pohang-si (KR); Ki Young Kim, Pohang-si (KR); Woo Chul Jung, Pohang-si (KR); Kwang Seok Park, Pohang-si (KR); Hyunwoo Lee, Pohang-si (KR); Woonkyoung Park, Pohang-si (KR); Sang Won Kim, Pohang-si (KR); Jung Kwan Park, Pohang-si (KR); Heok Yang, Pohang-si (KR); Sung Kook Park, Pohang-si (KR); Seung Taek Kuk, Pohang-si (KR)

(73) Assignees: POSCO CO., LTD, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 149 days.

(21) Appl. No.: 16/340,904

(22) PCT Filed: Sep. 29, 2017

(86) PCT No.: PCT/KR2017/010979
§ 371 (c)(1),
(2) Date: Apr. 10, 2019

(87) PCT Pub. No.: WO2018/070726
PCT Pub. Date: Apr. 19, 2018

(65) Prior Publication Data
US 2019/0233297 A1     Aug. 1, 2019

(30) Foreign Application Priority Data

Oct. 10, 2016  (KR) .......... 10-2016-0130399
Dec. 23, 2016  (KR) .......... 10-2016-0177675
(Continued)

(51) Int. Cl.
*C01D 15/06* (2006.01)
*B01D 61/42* (2006.01)
(Continued)

(52) U.S. Cl.
CPC ............ *C01D 15/06* (2013.01); *B01D 61/42* (2013.01); *C01B 25/30* (2013.01); *C01D 15/02* (2013.01); *C01D 15/08* (2013.01); *H01M 10/54* (2013.01)

(58) Field of Classification Search
CPC ........ C01D 15/06; C01D 15/02; C01D 15/08; B01D 61/42; C01B 25/30; H01M 10/54
See application file for complete search history.

(56) References Cited

U.S. PATENT DOCUMENTS 2,608,465 A * 8/1952 Henderson ............ C01D 15/06
423/551
4,443,421 A * 4/1984 Hollifield ............ C01B 25/235
210/791
(Continued)

FOREIGN PATENT DOCUMENTS

CN   102036739 A   4/2011
GB       424757 A   2/1935
(Continued)

OTHER PUBLICATIONS

Written Opinion and International Search Report dated Jan. 31, 2018 issued in International Patent Application No. PCT/KR2017/010979 (with partial English translation).
(Continued)

*Primary Examiner* — Michael Forrest
(74) *Attorney, Agent, or Firm* — Morgan, Lewis & Bockius LLP

(57) ABSTRACT

This disclosure relates to a method of preparing a lithium compound that includes preparing a lithium phosphate, mixing the lithium phosphate with sulfuric acid to obtain a mixture, converting the lithium phosphate into lithium sulfate through a reaction in the mixture, and separating the lithium sulfate in a solid phase, wherein in the step of converting the lithium phosphate into lithium sulfate
(Continued)

through the reaction in the mixture, a sum concentration ([P+S] mol/L) of phosphorus (P) and sulfur (S) in a liquid phase of the mixture is greater than or equal to 5 mol/L.

10 Claims, 15 Drawing Sheets

(30) Foreign Application Priority Data

Dec. 23, 2016 (KR) .......................... 10-2016-0177793
Sep. 28, 2017 (KR) .......................... 10-2017-0126036

(51) Int. Cl.
*C01B 25/30* (2006.01)
*C01D 15/02* (2006.01)
*C01D 15/08* (2006.01)
*H01M 10/54* (2006.01)

(56) References Cited

U.S. PATENT DOCUMENTS

| | | | |
|---|---|---|---|
| 4,723,962 A * | 2/1988 | Mehta | ...................... C01D 15/06 23/295 R |
| 6,803,491 B1 | 10/2004 | Shum | |
| 2011/0203929 A1 | 8/2011 | Buckley et al. | |
| 2015/0071837 A1 * | 3/2015 | Chon | ...................... B01J 4/002 423/179.5 |
| 2015/0139886 A1 * | 5/2015 | Bourassa | ............... C01D 15/08 423/421 |
| 2016/0152472 A1 * | 6/2016 | Hou | ......................... C01B 25/12 423/318 |

FOREIGN PATENT DOCUMENTS

| | | |
|---|---|---|
| JP | S57-095826 A | 6/1982 |
| JP | 2009-269810 A | 11/2009 |
| JP | 2009-270189 A | 11/2009 |
| JP | 2012-504545 A | 2/2012 |
| KR | 10-2012-0021675 A | 3/2012 |
| KR | 10-2014-0144381 A | 12/2014 |
| KR | 10-2016-0002579 A | 1/2016 |
| KR | 10-2016-0075679 A | 6/2016 |
| KR | 10-2016-0075680 A | 6/2016 |
| KR | 10-1674393 B1 | 11/2016 |
| KR | 10-2018-0039303 A | 4/2018 |
| WO | 2016/070217 A1 | 5/2016 |

OTHER PUBLICATIONS

Extended European Search Report issued in corresponding European Patent Application No. 17859636.7, dated Sep. 20, 2019.
Chinese Office Action and Search Report dated Jan. 6, 2021 issued in Chinese Patent Application No. 201780062755.6.

* cited by examiner

[Schematic View of Device Operation]

METHOD OF PREPARING LITHIUM COMPOUND

CROSS-REFERENCE TO RELATED APPLICATION

This application is the U.S. National Phase under 35 U.S.C. § 371 of International Patent Application No. PCT/KR2017/010979, filed on Sep. 29, 2017, which in turn claims priorities to and the benefit of Korean Patent Application Nos. 10-2016-0130399, 10-2016-0177675, 10-2016-0177793, and 10-2017-0126036 filed in the Korean Intellectual Property Office on Oct. 10, 2016, Dec. 23, 2016, Dec. 23, 2016, and Sep. 28, 2017, respectively the entire contents of which are incorporated herein by reference.

BACKGROUND OF THE INVENTION

(a) Field of the Invention

This disclosure relates to a method of preparing a lithium compound that is capable of converting lithium phosphate into other lithium compounds effectively.

(b) Description of the Related Art

An effective compound of extracting lithium from a salt lake or a waste battery as a lithium compound may be lithium phosphate.

The reason is that lithium phosphate has very low solubility and thus may be effectively precipitated through a reaction of lithium with phosphoric acid.

However, since the phosphoric acid is expensive, technology of recovering the phosphoric acid at a high concentration from the lithium phosphate and reusing it is required to secure economic feasibility of the method of extracting lithium into the lithium phosphate.

In addition, the lithium phosphate is very stable and thus may not be easily converted into a commercially available lithium compound.

Accordingly, a method of effectively converting the lithium phosphate into a lithium compound having higher reactivity is required.

SUMMARY OF THE INVENTION

Technical Object

A method of converting lithium phosphate into other lithium compounds effectively is provided.

In addition, a preparation method capable of recovering phosphoric acid in lithium phosphate at a high concentration and simultaneously improving a recovery rate of phosphoric acid is provided.

In addition, a method of preparing a highly pure lithium compound by removing impurities effectively in a preparing process is provided.

Technical Solution

A method of preparing a lithium compound according to an example embodiment includes preparing a lithium phosphate, mixing the lithium phosphate with sulfuric acid to obtain a mixture, converting the lithium phosphate into lithium sulfate through a reaction in the mixture, and separating the lithium sulfate in a solid phase, wherein in the step of converting the lithium phosphate into lithium sulfate through a reaction in the mixture, a sum concentration ([P+S] mol/L) of phosphorus (P) and sulfur (S) in a liquid phase of the mixture is greater than or equal to 5 mol/L.

The step of converting the lithium phosphate into lithium sulfate through the reaction in the mixture may include a reaction of Reaction Scheme 1.

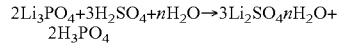

[Reaction Scheme 1]

In addition, the step of preparing the lithium phosphate may be preparing a solid-phase lithium phosphate itself or preparing a solid-phase lithium phosphate in a slurry state in a solvent.

Herein, the step of preparing the lithium phosphate may be preparing a solid-phase lithium phosphate in a slurry state in a solvent and the solvent may be water or phosphoric acid.

The step of separating the lithium sulfate in a solid phase may further include separating a solid-phase lithium sulfate and recovering a high concentration phosphoric acid filtrate.

Herein, a concentration of phosphoric acid in the recovered high concentration phosphoric acid filtrate may be greater than or equal to 40 wt %.

The recovered high concentration phosphoric acid filtrate may be used as a solvent during the step of preparing the solid-phase lithium phosphate in a slurry state in a solvent.

Alternatively, the recovered high concentration phosphoric acid filtrate may be used for production of the lithium phosphate before the step of preparing the lithium phosphate.

Meanwhile, the method of preparing a lithium compound may include washing the separated solid-phase lithium sulfate and reusing washing water used in the step of washing as a solvent during the step of preparing the solid-phase lithium phosphate in a slurry state in a solvent, after the step of separating the lithium sulfate in a solid phase.

In the step of washing the separated solid-phase lithium sulfate, pure water (DI water) may be used.

The step of washing the separated solid-phase lithium sulfate may use an alcohol based solvent, and the alcohol based solvent may be recovered by distillation of washing water including the alcohol based solvent and may be reused in the step of washing of the solid-phase lithium sulfate.

The method may further include dissolving the separated lithium sulfate in pure water to prepare the lithium sulfate aqueous solution and converting the lithium sulfate aqueous solution into lithium hydroxide using an electrodialysis device including bipolar membranes.

Herein, the method may further include carbonizing the converted lithium hydroxide to obtain lithium carbonate.

Meanwhile, the step of washing the separated solid-phase lithium sulfate may use pure water (DI water) and may include washing the same twice or more.

Specifically, the step of washing the separated solid-phase lithium sulfate may include obtaining $n^{th}$ washing water by $n^{th}$ washing, reusing a part of the $n^{th}$ washing water as a solvent during the step of preparing a solid-phase lithium phosphate in a slurry state in a solvent, and $(n+1)^{th}$ washing lithium sulfate with a mixture of the remaining part of the $n^{th}$ washing water with additional pure water.

The method of preparing a lithium compound may include using a whole of the $(n+1)^{th}$ washing water during $(n+2)^{th}$ washing, reusing a part of $(n+2)^{th}$ washing obtained by $(n+2)^{th}$ washing as a solvent during the step of preparing the solid-phase lithium phosphate in a slurry state in a solvent, and $(n+3)^{th}$ washing lithium sulfate with a mixture of the remaining part of the $(n+2)^{th}$ washing water with additional pure water.

Meanwhile, in the step of converting the lithium sulfate aqueous solution into lithium hydroxide using an electrodialysis device including bipolar membranes, the electrodialysis device may have a structure where an anion separation membrane and a cation separation membrane are sequentially disposed between bipolar membranes facing each other.

The step of converting the lithium sulfate aqueous solution into lithium hydroxide using an electrodialysis device including bipolar membranes may satisfy an operating condition wherein pH is less than or equal to 3.5 without an additional separate acid.

In the step of converting the lithium sulfate aqueous solution into lithium hydroxide using an electrodialysis device including bipolar membranes, the lithium sulfate added to the electrodialysis device may be continuously added during a process operation.

In the step of converting the lithium sulfate aqueous solution into lithium hydroxide using an electrodialysis device including bipolar membranes, the lithium sulfate added to the electrodialysis device may play a role of a raw material and a pH controlling agent simultaneously.

Meanwhile, the method of preparing a lithium compound may further include washing the separated solid-phase lithium sulfate before the step of dissolving the separated lithium sulfate in pure water to prepare a lithium sulfate aqueous solution, the separated solid-phase lithium sulfate may include cation impurities except lithium, the cation impurities may primarily be purified during the step of washing the separated solid-phase lithium sulfate, and a remaining cation impurities after the primary purification may secondarily be purified in the step of converting the lithium sulfate aqueous solution into lithium hydroxide using the electrodialysis device including bipolar membranes.

The cation impurities may be at least one selected from the group consisting of potassium (K), sodium (Na), magnesium (Mg), boron (B), nickel (Ni), and calcium (Ca).

An amount of the cation impurities purified during the step of washing the separated solid-phase lithium sulfate may be greater than or equal to 50 wt % based on a total amount of the cation impurities (100 wt %) in lithium phosphate in the step of mixing the lithium phosphate with sulfuric acid to obtain the mixture.

The cation impurities may include a cation of potassium (K), sodium (Na), magnesium (Mg), boron (B), nickel (Ni), or a combination thereof and an amount of the cation of potassium (K), sodium (Na), magnesium (Mg), boron (B), nickel (Ni), or a combination thereof, which is purified during the washing the separated solid-phase lithium sulfate may be greater than or equal to 95 wt % based on a total amount of the cation impurities (100 wt %) in lithium phosphate in the step of mixing the lithium phosphate with sulfuric acid to obtain the mixture.

The cation impurities may include a calcium (Ca) cation and an amount of a calcium (Ca) cation impurity purified during the washing the separated solid-phase lithium sulfate may be greater than or equal to 50 wt % based on a total amount of the cation impurities (100 wt %) in lithium phosphate in the step of mixing the lithium phosphate with sulfuric acid to obtain the mixture.

A method of preparing a lithium compound according to the present example embodiment may further include concentrating the lithium hydroxide aqueous solution converted in the bipolar electrodialysis device and crystallizing the same, obtaining a crystallization filtrate produced during the crystallizing step, and drying the crystallized lithium hydroxide to obtain lithium hydroxide in a powder form after the step of converting the lithium sulfate aqueous solution into a lithium hydroxide aqueous solution, a desalted solution, and a sulfuric acid aqueous solution using the electrodialysis device including the bipolar membranes.

Herein, the step of separating the lithium sulfate in a solid phase may further include separating a solid-phase lithium sulfate and recovering a high concentration phosphoric acid filtrate, and the lithium phosphate in the step of preparing the lithium phosphate may be prepared using the recovered high concentration phosphoric acid filtrate and the crystallization filtrate.

In addition, the lithium phosphate of the step of preparing the lithium phosphate may be prepared by using the recovered high concentration phosphoric acid filtrate, the crystallization filtrate, and a basic material.

The basic material may include at least one of sodium hydroxide, potassium hydroxide, calcium hydroxide, barium hydroxide, magnesium hydroxide, calcium oxide, lithium, potassium, and sodium.

Meanwhile, the present example embodiment may further include adding a basic material to the lithium sulfate aqueous solution to adjust pH to be greater than or equal to 10 after the step of dissolving the solid-phase lithium sulfate in the solvent to obtain the lithium sulfate aqueous solution.

Herein, the basic material may include at least one of sodium hydroxide, potassium hydroxide, calcium hydroxide, barium hydroxide, magnesium hydroxide, calcium oxide, lithium, potassium, and sodium.

Alternatively, the method may further include adding a crystallization filtrate obtained during the concentrating and crystallizing the lithium hydroxide aqueous solution or the lithium hydroxide aqueous solution converted using the electrodialysis device, to the lithium sulfate aqueous solution so that pH may be adjusted to be greater than or equal to 10 after the step of dissolving the solid-phase lithium sulfate in the solvent to obtain the lithium sulfate aqueous solution.

The present example embodiment may further include removing cation impurities in the lithium sulfate aqueous solution through a solid-phase separation after adjusting pH of the lithium sulfate aqueous solution to be greater than or equal to 10.

The cation impurities may be at least one selected from the group consisting of potassium (K), sodium (Na), magnesium (Mg), boron (B), and calcium (Ca).

More specifically, the cation impurities may be divalent cation impurities.

The method may include reusing the desalted solution converted using the electrodialysis device as a solvent during the step of dissolving the solid-phase lithium sulfate in the solvent to obtain the lithium sulfate aqueous solution.

In addition, the sulfuric acid aqueous solution converted using the electrodialysis device may be concentrated and reused during the step of mixing the lithium phosphate with sulfuric acid to obtain the mixture.

Effect of the Invention

According to an example embodiment, lithium phosphate may be effectively converted into other lithium compounds.

In addition, the lithium phosphate may secure economic feasibility by reconvering phosphoric acid at a high concentration therefrom and thus using it in various methods such as reuse for its own process, production of lithium phosphate, and the like. Furthermore, a recovery rate of the phosphoric acid may be increased by making the lithium phosphate into slurry in low concentration phosphoric acid and then, reacting the lithium phosphate with sulfuric acid to precipitate lithium sulfate, washing the precipitated lithium sulfate with a washing solution, obtaining low concentration phosphoric acid with the washing water, and reusing the low concentration phosphoric acid to make lithium phosphate into slurry.

In addition, lithium in the desalted solution and the crystallization filtrate may be recovered again by reusing the desalted solution and the crystallization filtrate produced in a bipolar electrodialysis device during a process of preparing lithium compounds.

Furthermore, the bipolar electrodialysis process may not only be stably run, but the lithium compounds may also be obtained with high purity by adjusting pH of the lithium sulfate aqueous solution to remove impurities. In addition, since the produced desalted solution and acid solution may be reused and in addition, if ever, wastewater-treated with a low cost, economic feasibility may be secured.

DETAILED DESCRIPTION

The present invention will be described more fully hereinafter, in which exemplary embodiments of the invention are shown. The present invention may be modified in various different ways, all without departing from the spirit or scope of the present invention.

In addition, unless explicitly described to the contrary, the word "comprise" and variations such as "comprises" or "comprising," will be understood to imply the inclusion of stated elements but not the exclusion of any other elements.

Hereinafter, a method of preparing a lithium compound according to an example embodiment is described.

A method of preparing a lithium compound according to an example embodiment includes preparing a lithium phosphate, mixing the lithium phosphate with sulfuric acid to obtain a mixture, converting the lithium phosphate into lithium sulfate through a reaction in the mixture and separating the lithium sulfate in a solid phase.

Particularly, in the present example embodiment, in the step of converting the lithium phosphate into lithium sulfate through a reaction in a liquid phase of the mixture, a sum concentration ([P+S] mol/L) of phosphorus (P) and sulfur (S) in the mixture is greater than or equal to 5 mol/L.

In this regard, the present inventors have experimentally discovered that lithium sulfate has high solubility in water or low concentration phosphoric acid, but this solubility is sharply decreased in a high concentration phosphoric acid solution wherein sulfuric acid ions are present. In other words, lithium which is present at a higher concentration than the solubility in the high concentration phosphoric acid solution wherein sulfuric acid ions are present is precipitated into lithium sulfate ($Li_2SO_4$), and the high concentration phosphoric acid solution is produced through a direct reaction of lithium phosphate with sulfuric acid. Subsequently, the precipitated lithium sulfate may be solid/liquid-separated, and simultaneously, a filtrate including high concentration phosphoric acid may be directly recovered.

Figure 1:
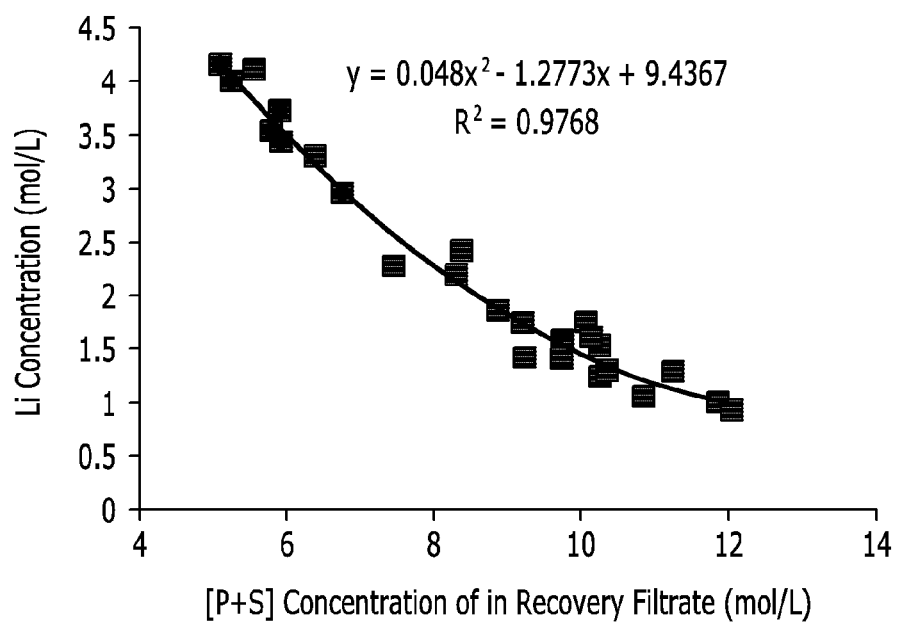
FIG. 1 is a graph showing solubility changes of lithium depending on concentrations of phosphorus (P) and sulfur (S) in a recovery filtrate.

FIG. 1 is a graph showing solubility changes of lithium depending on concentrations of phosphorus (P) and sulfur (S) in a recovery filtrate. As shown in FIG. 1, when concentrations of phosphoric acid and sulfuric acid are increased, a lithium concentration in a solution is sharply decreased. In other words, lithium is mostly precipitated into lithium sulfate.

Therefore, in the step of converting the lithium phosphate into lithium sulfate through a reaction in a liquid phase of the mixture, when the sum concentration ([P+S] mol/L) of phosphorus (P) and sulfur (S) in the mixture is greater than or equal to 5 mol/L, a recovery rate of lithium may be increased.

The sum concentration ([P+S] mol/L) of phosphorus (P) and sulfur (S) may be for example greater than or equal to 6 mol/L and less than or equal to 15 mol/L. The upper limit of the range is a theoretically calculated maximum upper limit. In other words, as the sum concentration of phosphorus and sulfur is increased within the range considering economic feasibility, a concentration of phosphoric acid in a recovery filtrate and thus a lithium recovery rate are increased.

Specifically, the sum concentration of phosphorus (P) and sulfur (S) in a mixture may be in a range of greater than or equal to 5.5 mol/L and less than or equal to 15 mol/L, greater than or equal to 6 mol/L and less than or equal to 15 mol/L, greater than or equal to 7 mol/L and less than or equal to 15 mol/L, greater than or equal to 8 mol/L and less than or equal to 15 mol/L, greater than or equal to 9 mol/L and less than or equal to 15 mol/L, greater than or equal to 10 mol/L and less than or equal to 15 mol/L, or greater than or equal to 12 mol/L and less than or equal to 15 mol/L.

When this range is satisfied, lithium sulfate may be precipitated as a solid-phase due to its solubility decrease. In other words, a concentration of lithium remaining in a solution wherein the lithium sulfate is precipitated as a solid-phase may be largely decreased. Specifically, the concentration of lithium remaining in a solution wherein the lithium sulfate is precipitated as a solid-phase may be less than or equal to 4 mol/L, less than or equal to 3 mol/L, less than or equal to 2 mol/L, less than or equal to 1 mol/L, or less than or equal to 0.5 mol/L. Accordingly, most of lithium is precipitated.

Specifically, the used lithium phosphate may be powder. The lithium phosphate powder may have a diameter ranging from 1 to 200 μm or larger. Sulfuric acid has a concentration ranging from 5 to 98 wt % as a solution phase, and as the concentration of the sulfuric acid is higher, phosphoric acid at a higher concentration may be extracted.

The lithium phosphate powder is mixed with a 1 to 50 wt % phosphoric acid solution or water and thus prepared into slurry. This slurry process of the lithium phosphate powder may be omitted, but when the lithium phosphate powder is directly reacted with sulfuric acid, a recovery rate of phosphoric acid may be decreased, since uniformity of the reaction is deteriorated, and lithium sulfate having high permeability is difficult to precipitate.

The step of converting the lithium phosphate into the lithium sulfate through a reaction in the mixture may include a reaction of Reaction Scheme 1. That, sulfuric acid is added to the lithium phosphate powder or slurry, lithium phosphate is converted into lithium sulfate according to Reaction Scheme 1 and thus phosphoric acid is separated.

$$2Li_3PO_4 + 3H_2SO_4 + nH_2O \rightarrow 3Li_2SO_4 \cdot nH_2O + 2H_3PO_4$$  [Reaction Scheme 1]

The converted lithium sulfate is precipitated, as a concentration of phosphoric acid is increased, and herein, as the reaction goes, the concentration of phosphoric acid is increased, and thus solubility of lithium in the phosphoric acid is decreased. The solubility of lithium in the phosphoric acid may be expressed as a function depending on concentrations of P and S elements of the phosphoric acid as the following equation.

Equation 1 uses an approximate value of data in FIG. 1.

Lithium concentration in filtrate=0.048*(P concentration+S concentration)$^2$−1.2773*(P concentration+S concentration)+9.4367±0.6   [Equation 1]

In Equation 1, units of the lithium solubility and units of the P concentration and the S concentration are mol/L.

When the reaction is complete, a mixture of the phosphoric acid and the lithium sulfate is solid/liquid-separated.

The separated lithium sulfate cake is washed by using an organic solvent such as ethanol, methanol, and the like or water.

The washing solution includes a large amount of phosphoric acid, and when the organic solvent is used, phosphoric acid is recovered through distillation, and the washing solution or the recovered phosphoric acid may be reused for a lithium phosphate slurry preparation process.

Meanwhile, the step of preparing the lithium phosphate may be preparing a solid-phase lithium phosphate itself or preparing a solid-phase lithium phosphate in a slurry state in a solvent.

When the lithium phosphate is prepared as slurry, its reaction rate with sulfuric acid may be further improved.

In addition, the step of preparing the lithium phosphate may be preparing a solid-phase lithium phosphate in a slurry state in a solvent and the solvent may be water or phosphoric acid. However, it is not limited thereto.

In the step of separating the lithium sulfate in a solid phase, the method may further include separating a solid-phase lithium sulfate and recovering a high concentration phosphoric acid filtrate.

Herein, a concentration of phosphoric acid in the recovered high concentration phosphoric acid filtrate may be greater than or equal to 40 wt %. More specifically, the concentration of phosphoric acid in the recovered high concentration phosphoric acid filtrate may be greater than or equal to 50 wt % or greater than or equal to 60 wt %. Recovery of lithium including high concentration phosphoric acid to such a level has not been reported in this art.

Like this, the recovered high concentration phosphoric acid filtrate may be used as a solvent during the step of preparing the solid-phase lithium phosphate in a slurry state in a solvent.

Alternatively, the recovered high concentration phosphoric acid filtrate may be used for production of the lithium phosphate before the step of preparing the lithium phosphate.

For example, when phosphoric acid in a lithium-containing solution is added, lithium phosphate is easily precipitated.

In the present example embodiment, this lithium-containing solution may variously include sea water, brine, a mineral-extracting solution, a waste battery recovery solution, and the like. This is well known in a related field and thus will not be illustrated in detail hereinafter.

The method may include washing the separated solid-phase lithium sulfate and reusing washing water used in the step of washing as a solvent during the step of preparing the solid-phase lithium phosphate in a slurry state in a solvent, after the step of separating the lithium sulfate in a solid phase.

The washing may be performed to increase purity of the separated lithium sulfate, since a filtrate still remains on the surface of the lithium sulfate, and recover phosphoric acid in the filtrate.

In the step of washing the separated solid-phase lithium sulfate, pure water (DI water) may be used. Herein, when the pure water is used for the washing, the lithium sulfate has high solubility in water, and thus lithium may be more or less lost into the washing water. However, the lost lithium is mixed again into the lithium phosphate slurry and thus has no influence on a lithium recovery rate over the entire reaction.

Meanwhile, the step of washing the separated solid-phase lithium sulfate may use pure water (DI water) and include washing the same twice or more.

More specifically, the step of washing the separated solid-phase lithium sulfate may include obtaining $n^{th}$ washing water by $n^{th}$ washing; and reusing a part of the $n^{th}$ washing water as a solvent during the step of preparing a solid-phase lithium phosphate in a slurry state in a solvent; and $(n+1)^{th}$ washing lithium sulfate with a mixture of the remaining part of the $n^{th}$ washing water with additional pure water.

More specifically, the method may further include using a whole of the $(n+1)^{th}$ washing water during $(n+2)^{th}$ washing; reusing a part of $(n+2)^{th}$ washing obtained by $(n+2)^{th}$ washing as a solvent during the step of preparing the solid-phase lithium phosphate in a slurry state in a solvent; and $(n+3)^{th}$ washing lithium sulfate with a mixture of the remaining part of the $(n+2)^{th}$ washing water with additional pure water.

More specifically, the reusing of a part of the $n^{th}$ washing water as a solvent during the step of preparing a solid-phase lithium phosphate in a slurry state in a solvent may be reusing 30 wt % to 70 wt % of the $n^{th}$ washing water as a solvent during the step of preparing a solid-phase lithium phosphate in a slurry state in a solvent.

In addition, during the step of $(n+1)^{th}$ washing the lithium sulfate with the mixture of the remaining part of the $n^{th}$ washing water with additional pure water, the additional pure water may be added so that an entire amount used for $n^{th}$ washing may be adjusted.

In addition, the washing water used for the $(n+1)^{th}$ washing may be all used for $(n+2)^{th}$ washing.

In other words, an additionally addition amount of pure water may be the same as an amount of a solvent used in a step of preparing the solid-phase lithium phosphate into slurry by reusing the washing water as the solvent even though the washing times are increased.

This method may recover phosphoric acid in the recovered filtrate at a higher concentration and improved purity of the recovered lithium sulfate.

The step of washing the separated solid-phase lithium sulfate may use an alcohol based solvent and the alcohol based solvent may be recovered by distillation of washing water including the alcohol based solvent and may be reused in the step of washing of the solid-phase lithium sulfate.

Specific examples of the alcohol based solvent may be ethanol.

For example, since solubility of lithium sulfate in ethanol is very low, an amount of lithium lost through the washing of the lithium sulfate may be very insignificant.

However, the ethanol should be separated again to reuse the washing water, and herein, the separation may be performed through a method such as distillation and the like.

The separated ethanol may be reused for washing a solid-phase lithium sulfate, and a filtrate remaining after the distillation contains phosphoric acid as a main component and thus may be reused to make lithium phosphate into slurry as described above.

The method may further include dissolving the separated lithium sulfate in pure water to prepare the lithium sulfate aqueous solution and converting the lithium sulfate aqueous solution into lithium hydroxide using an electrodialysis device including bipolar membranes.

The lithium sulfate has high solubility in water and thus may be easily converted into an aqueous solution phase. This lithium sulfate aqueous solution may be converted into lithium hydroxide by using an electrodialysis device equipped with bipolar membranes and monovalent and divalent ion separation membranes.

Figure 2:
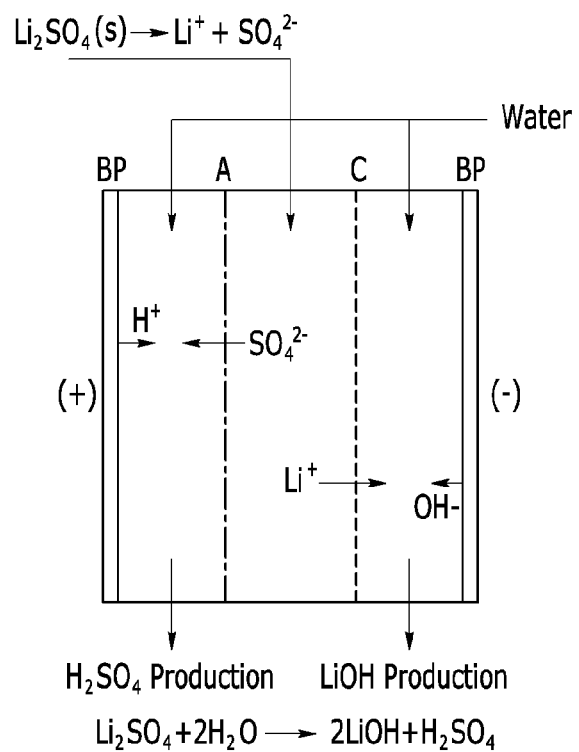
FIGS. 2 and 3 are schematic views of electrodialysis devices according to embodiments of the present invention.

FIG. 2 is a schematic view showing an electrodialysis device according to an embodiment of the present invention.

A lithium sulfate solid powder obtained from the former process is dissolved in pure water (DI water) and thus prepared as a raw solution, which is supposed to be added to an electrodialysis device.

When the raw solution is treated through a bipolar electrodialysis device as shown FIG. 2, $SO_4^{2-}$ moving through an anion exchange membrane reacts with hydrogen hydrolyzed in a bipolar membrane at an anode and thus is obtained as sulfuric acid ($H_2SO_4$), and lithium ions moving toward a cathode through a cation exchange membrane react with $OH^-$ generated from the bipolar membrane and thus are obtained as LiOH. In other words, the whole reaction is as follows.

Whole reaction: 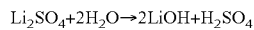 $Li_2SO_4 + 2H_2O \rightarrow 2LiOH + H_2SO_4$

In an embodiment of the present invention, a simple operation and an appropriate pH range for managing a lithium concentration of the added lithium sulfate aqueous solution to stably and effectively obtain the lithium hydroxide are derived. In addition, current efficiency and a conversion rate of the bipolar electrodialysis may be improved.

First of all, the lithium sulfate supplied in FIG. 2 may be not a conventional and commercially available lithium sulfate but lithium sulfate produced through a process according to the embodiment of the present invention.

When the lithium sulfate is dissolved, the solution maintains less than or equal to pH 3 which is lower than a pH range (greater than or equal to pH 4) of a commercially available lithium sulfate aqueous solution due to a feature of the process according to the embodiment of the present invention.

This feature is obtained by using the lithium sulfate obtained in the former process and satisfies the pH range of less than or equal to 3.5 for smoothly performing an electrodialysis. Accordingly, process stability may be secured without a pH adjustment through an addition of other acids (in general, sulfuric acid as for lithium sulfate).

When the raw solution, the lithium sulfate aqueous solution, has pH of greater than 3.5, an inverse diffusion may happen through a dialysis membrane and thus sharply increase the pH of the raw solution up to greater than 11, and resultantly, a bipolar process may not be performed.

Specifically, since the lithium sulfate obtained in the devised process as a raw material is used to manage pH of the lithium sulfate added to an electrodialysis process to be less than or equal to 3 without additionally adding acid, an pH increase during a process may be adjusted by adding a small amount of a lithium sulfate aqueous solution, and thus pH of the raw material may be managed to be less than 3.5 for continuously performing the process without additionally using acid.

Figure 3:
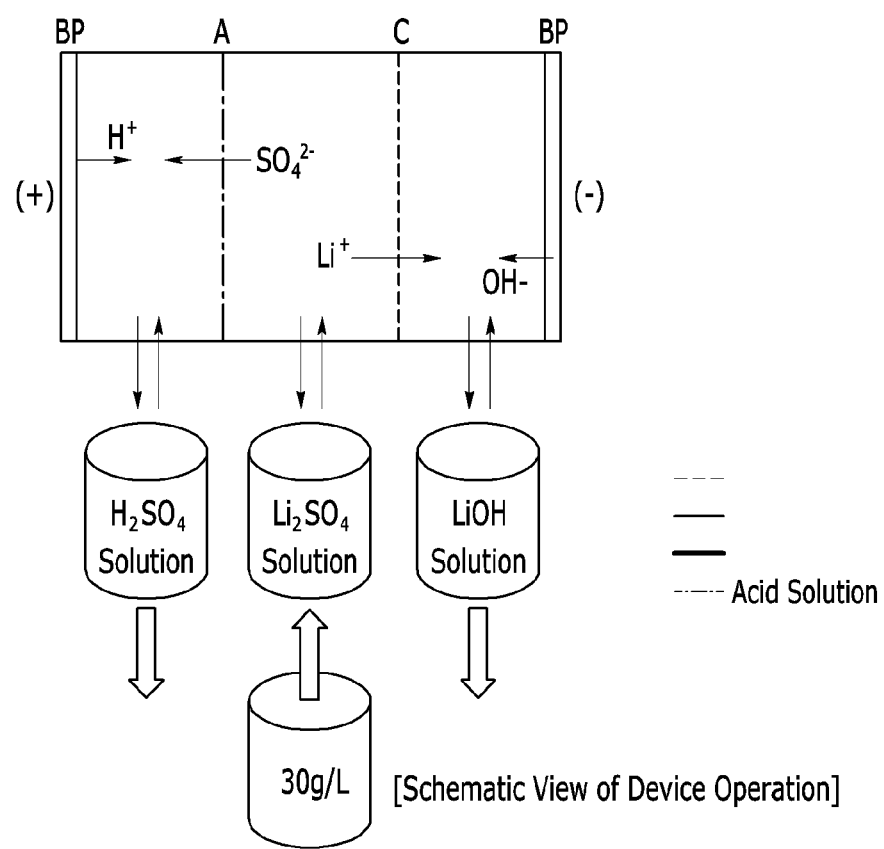

This process is shown in FIG. 3.

As shown in FIG. 3, a solution tank supplied with the lithium sulfate aqueous solution is managed to have initial pH into less than or equal to 3, and when the pH is increased during the process, the pH is adjusted to keep less than or equal to be 3 by adding a small amount of a lithium sulfate aqueous solution which is prepared with a lithium concentration of 30 g/L in advance.

Herein, 30 g/L of the added lithium sulfate is used to adjust pH and also, to stably maintain the process as a raw solution without external inflow of an acid or generation of a byproduct.

In addition, as for a conventional bipolar electrodialysis, a concentration of the initial solution, the lithium sulfate aqueous solution, is very strictly managed, for efficiency of obtained lithium hydroxide is determined depending on the concentration of the initial solution.

In other words, when the initial concentration is low, lithium may take longer time to obtain, but when the initial concentration is too high, sulfur (S or $SO_4^{2-}$) in the initial solution moves toward the lithium hydroxide aqueous solution and thus has thousands of ppm beyond a limit of hundreds of ppm. In order to improve this problem, the concentration of initially added lithium sulfate should be very strictly managed, which may be a problem of a process control.

When a concentration of the initially added lithium solution is changed as well as its pH is adjusted through a process of FIG. 3 according to an embodiment of the present invention, the concentration of the solution may be managed by supplying the 30 g/L lithium sulfate aqueous solution as a new lithium source.

Herein, the additionally added solution is used to have a lithium concentration of 30 g/L, a saturated concentration, in order to reduce an amount of the solution and thus, may be used in a range of 20 g/L to 34 g/L.

Figure 4:
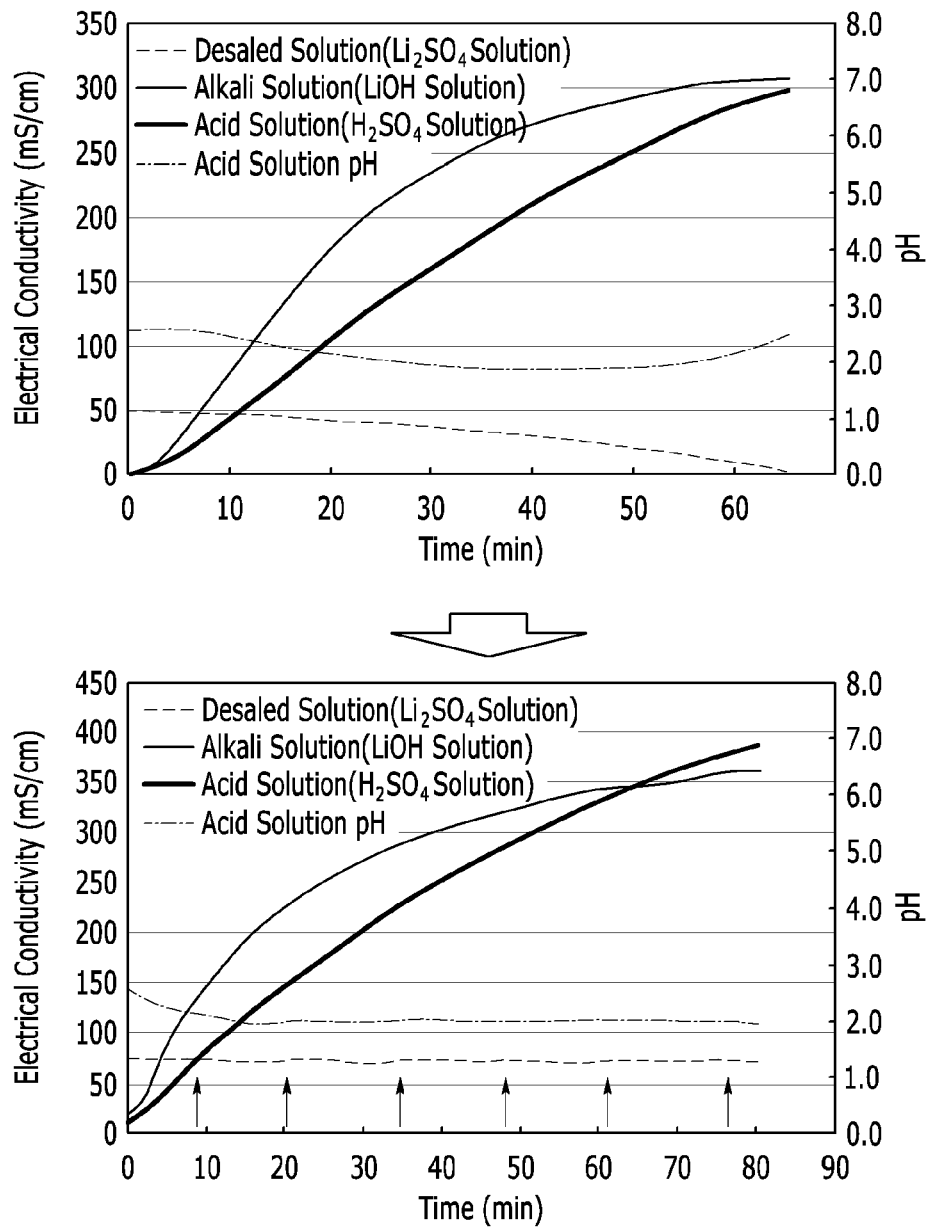
FIG. 4 shows experimental results of electrodialysis conditions.

The experimental results are shown in FIG. 4.

As shown in an upper graph of FIG. 4, since lithium is lost as a reaction time goes, a concentration of the raw solution (a blue line) is decreased during the electrodialysis. Accordingly, electrodialysis time and efficiency are deteriorated.

In an embodiment of the present invention, when an electric conductivity decrease due to the lithium concentration decrease is detected, a lithium raw solution at a high concentration is added thereto at a red arrow of the lower graph of FIG. 4 to stabilize a lithium concentration of the initially added solution.

Accordingly, the electrodialysis process may be stably maintained for a long time and also managed to continuously maintain pH to be less than or equal to 3.

When the electrodialysis process is performed through the process constitution and the adjustment of initial pH and a concentration, a conversion rate of lithium and sulfur (S) becomes less related with the initial concentration, and thus the process may be freely managed and operated.

In addition, sulfuric acid is simultaneously obtained at an opposite electrode to the recovery of lithium into lithium hydroxide. A lithium sulfate aqueous solution used under the condition has an initial concentration ranging from 4 g/L to 25 g/L.

In addition, since the initial lithium sulfate aqueous solution does not need to maintain a high lithium concentration during the process, a sulfur concentration proportional to the lithium concentration may be maintained to be low. This process is a main method of suppressing a concentration increase of sulfur moving toward a final lithium hydroxide aqueous solution, which happens in use of the initial solution at a high concentration in order to obtain the lithium hydroxide aqueous solution at a high concentration, and accordingly, the sulfur concentration in a lithium hydroxide product may be minimized through the method.

Since the initially supplied raw solution from which lithium is removed may be used to dissolve the initial lithium sulfate solid powder in the process, there may be no lithium loss as well as neither waste nor byproduct during the process.

The method may further include carbonizing the converted lithium hydroxide to obtain lithium carbonate.

A method of carbonizing lithium hydroxide may be a reaction with a carbon source such as carbon dioxide. But, it is not limited thereto, and various methods may be applied.

Meanwhile, according to an example embodiment of this disclosure, the method may further include washing the separated solid-phase lithium sulfate before the step of dissolving the separated lithium sulfate in pure water to prepare the lithium sulfate aqueous solution.

That is, a method of preparing a lithium compound according to the present example embodiment includes preparing a lithium phosphate, mixing the lithium phosphate with sulfuric acid to obtain a mixture, converting the lithium phosphate into lithium sulfate through a reaction in the mixture, separating the lithium sulfate in a solid phase, washing the separated solid-phase lithium sulfate, dissolving the washed solid-phase lithium sulfate in pure water to prepare a lithium sulfate aqueous solution, and converting the lithium sulfate aqueous solution into lithium hydroxide using an electrodialysis device including bipolar membranes, wherein in the step of converting the lithium phosphate into lithium sulfate through the reaction in the mixture, a sum concentration ([P+S] mol/L) of phosphorus (P) and sulfur (S) in a liquid phase of the mixture is greater than or equal to 5 mol/L.

Herein, the separated solid-phase lithium sulfate may include cation impurities except lithium, the cation impurities may primarily be purified during the step of washing the separated solid-phase lithium sulfate, and remaining cation impurities after the primary purification may secondarily be purified in the step of converting the lithium sulfate aqueous solution into lithium hydroxide using the electrodialysis device including bipolar membranes.

Figure 5:
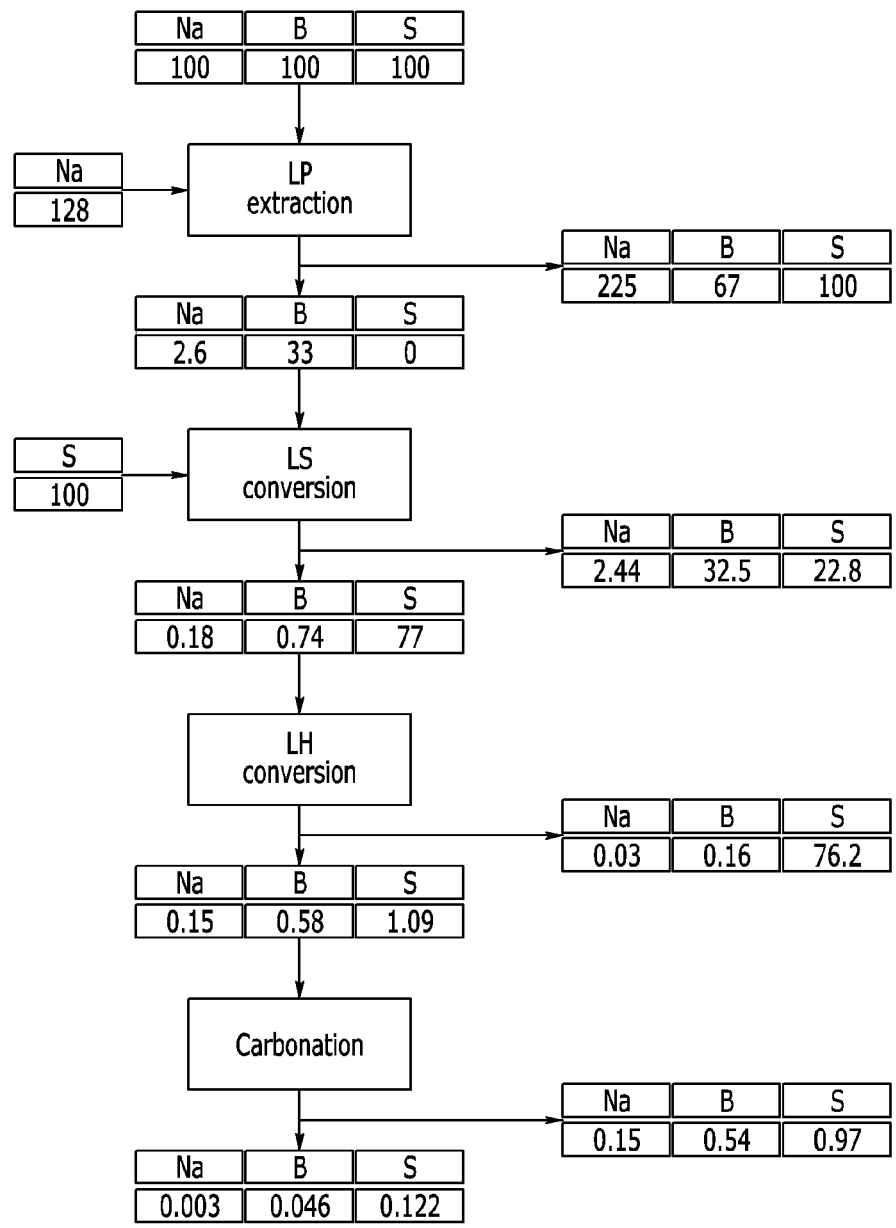
FIG. 5 exemplarily shows a removing process of cation impurities in a preparation process of a lithium compound according to example embodiments.

FIG. 5 exemplarily shows a removing process of cation impurities in a preparation process of a lithium compound according to the present example embodiments for easy understanding.

In the washed solid-phase lithium sulfate during the step of washing the separated solid-phase lithium sulfate, 50% or greater of cation impurities may be removed based on a total amount of the cation impurities (100 wt %) in lithium phosphate in the step of mixing the lithium phosphate with sulfuric acid to obtain the mixture.

Herein, the cation impurities may be at least one selected from the group consisting of potassium (K), sodium (Na), magnesium (Mg), boron (B), nickel (Ni) and calcium (Ca).

Specifically, 90% or greater, and more specifically 95% or greater of potassium (K), sodium (Na), magnesium (Mg), boron (B) and nickel (Ni) may be removed based on a total amount of the cation impurities (100 wt %) in lithium phosphate in the step of mixing the lithium phosphate with sulfuric acid to obtain the mixture and 20% or greater and more specifically 50% or greater of calcium (Ca) may be also removed.

Accordingly, when the washed solid-phase lithium sulfate is used to prepare lithium hydroxide, impurities included in a final product may be sharply reduced.

In other words, the solid-phase lithium sulfate includes cation impurities except for lithium, and the cation impurities are primarily removed while the solid-phase lithium sulfate is washed, but a small amount of the cation impurities still remaining after the washing is secondarily removed during a bipolar electrodialysis process to recover lithium hydroxide with high purity.

Accordingly, a lithium compound (e.g., lithium carbonate) converted from the recovered lithium hydroxide includes impurities in a small amount and thus may be applied to a rechargeable lithium battery with no washing or least washing, which may remarkably improve economic feasibility.

A method of preparing a lithium compound according to the present example embodiment that is one exemplary variation includes preparing a lithium phosphate, mixing the lithium phosphate with sulfuric acid to obtain a mixture, converting the lithium phosphate into lithium sulfate through a reaction in the mixture, separating the lithium sulfate in a solid phase, dissolving the solid-phase lithium sulfate in a solvent to obtain a lithium sulfate aqueous solution, and converting the lithium sulfate aqueous solution into a lithium hydroxide aqueous solution, a desalted solution, and a sulfuric acid aqueous solution using an electrodialysis device including bipolar membranes.

Figure 13:
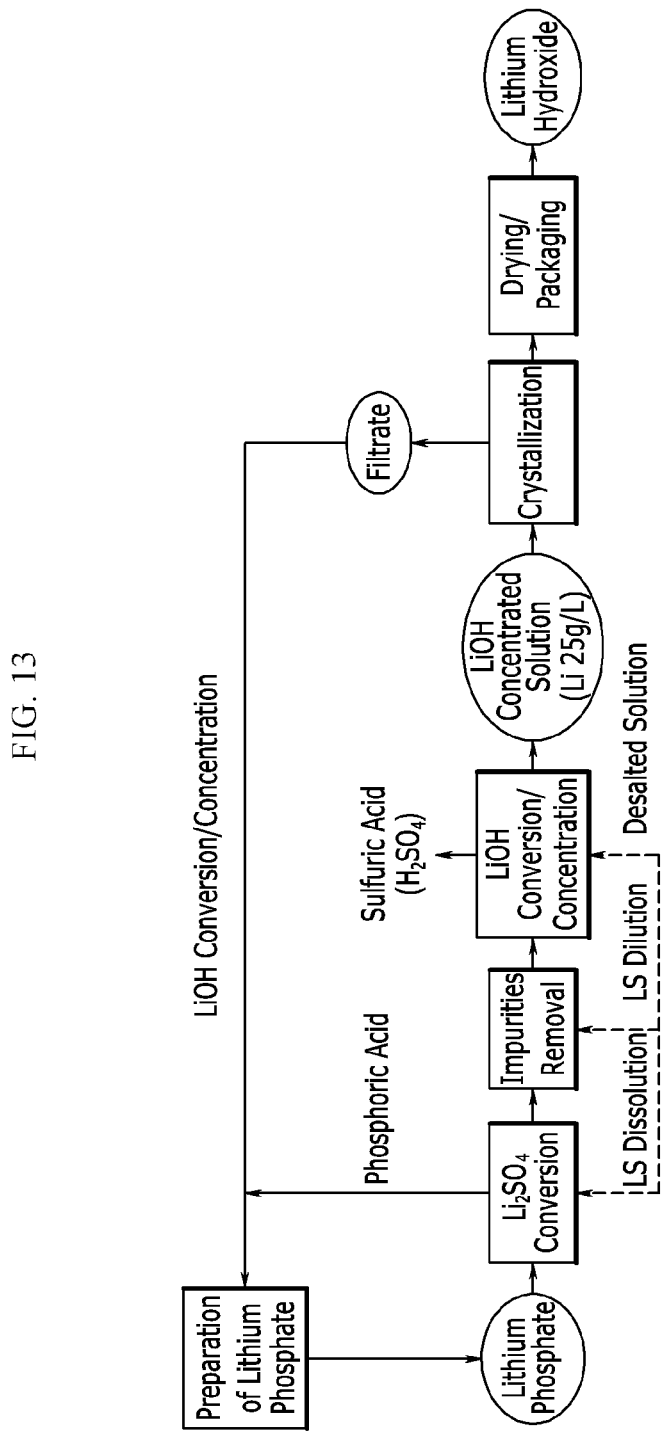
FIG. 13 exemplarily shows that the desalted solution and the crystallization filtrate that are produced in a bipolar electrodialysis device are reused in preparation of the lithium compound.

FIG. 13 exemplarily shows that the desalted solution and the crystallization filtrate that are produced in a bipolar electrodialysis device are reused in preparation of the lithium compound.

Referring to FIG. 13, first, lithium phosphate is prepared and the lithium phosphate is converted into lithium sulfate.

The step of converting lithium phosphate into lithium sulfate is performed through a reaction in the mixture obtained by mixing the lithium phosphate with sulfuric acid.

In the step of converting the lithium phosphate into lithium sulfate through the reaction in the mixture, a sum concentration ([P+S] mol/L) of phosphorus (P) and sulfur (S) in a liquid phase of the mixture is greater than or equal to 5 mol/L.

Details of the sum concentration of phosphorus and sulfur in a liquid phase of the mixture and Reaction Scheme are the same as in FIG. 1, Reaction Scheme 1, and Equation 1, and thus are not provided therein.

After the reaction is complete, the mixture of the phosphoric acid and lithium sulfate is separated by solid-liquid separation and thus a solid-phase lithium sulfate is separated.

Next, the solid-phase lithium sulfate is dissolved in a solvent to obtain a lithium sulfate aqueous solution and the lithium sulfate aqueous solution is added to the electrodialysis device including bipolar membranes and is converted into a lithium hydroxide aqueous solution. The solvent may be pure water (DI water).

In the step of converting it into the lithium hydroxide aqueous solution using the electrodialysis device including bipolar membranes, a desalted solution and a sulfuric acid aqueous solution are also produced.

The lithium sulfate is a material having high solubility in water and thus may be easily converted into an aqueous solution phase. This lithium sulfate aqueous solution may be converted into lithium hydroxide by using an electrodialysis device equipped with a bipolar membrane and monovalent and divalent ion separation membranes.

Referring to FIG. 2 again, the electrodialysis device including a bipolar membranes used to convert the lithium hydroxide aqueous solution according to the present example embodiment may have a structure that an anode cell including an anode (+) and a cathode cell including a first bipolar membrane (BP), an anion-selective dialysis membrane (A), a cation-selective dialysis membrane (C), a second bipolar membrane (BP), and a cathode (−) are sequentially disposed.

The solid-phase lithium sulfate separated in the former step may be dissolved by using pure water (DI water), and a lithium sulfate aqueous solution obtained therefrom may be put in the electrodialysis device.

The above electrodialysis device is used to add the lithium sulfate aqueous solution between the anion-selective dialysis membrane (A) and the cation-selective dialysis membrane (B), and water is respectively added between the first bipolar membrane (BP) and the anion-selective dialysis membrane (C) and between the second bipolar membrane (BP) and the cation-selective dialysis membrane (B) to prepare a bipolar electrodialysis.

When electricity is applied to the bipolar electrodialysis device into which the lithium sulfate aqueous solution and the water are added, the concentrated solution, water, is hydrolyzed in each bipolar membrane, and cations and anions in the lithium sulfate aqueous solution respectively move toward the cathode and the anode due to an electrophoresis effect.

In other words, $SO_4^{2-}$ meets hydrogen hydrolyzed in the first bipolar membrane at the anode and is recovered into sulfuric acid ($H_2SO_4$). In addition, lithium ions moving toward the cathode through the cation-selective dialysis membrane react with $OH^-$ generated from the second bipolar membrane and thus is recovered into lithium hydroxide (LiOH). In other words, the whole reaction is as follows.

Whole reaction: 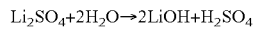
$$Li_2SO_4 + 2H_2O \rightarrow 2LiOH + H_2SO_4$$

Comprehensively, a desalted solution ($Li_2SO_4$) may be recovered with the lithium hydroxide (LiOH) aqueous solution and the sulfuric acid ($H_2SO_4$) aqueous solution through the conversion process using the electrodialysis device including bipolar membranes.

This obtained lithium hydroxide aqueous solution may be recovered as powder through concentration and crystallization, obtaining a crystallization filtrate from the crystallization, and drying the crystallized lithium hydroxide to make the lithium hydroxide into powder.

Meanwhile, the step of separating the lithium sulfate in a solid phase may further include recovering a high concentration phosphoric acid filtrate that remains after separating the solid-phase lithium sulfate and preparing a lithium phosphate using the high concentration phosphoric acid filtrate.

As described above, the lithium phosphate may be prepared by using the recovered high concentration phosphoric acid filtrate and the crystallization filtrate obtained during a crystallization process of the lithium hydroxide.

Likewise, the prepared lithium phosphate may be used as the lithium phosphate in the step of preparing the lithium phosphate in the preparation process of the lithium compound according to the present example embodiment.

Herein, the lithium phosphate in the step of preparing the lithium phosphate may be prepared by using the recovered high concentration phosphoric acid filtrate and the crystallization filtrate as described above. In addition, the lithium phosphate may be prepared by adjusting pH to be greater than or equal to 9.5 by using a basic material with the recovered high concentration phosphoric acid filtrate and the crystallization filtrate.

When the high concentration phosphoric acid filtrate and the crystallized filtrate are appropriately mixed according to a chemical equivalent of lithium phosphate, pH of the mixture is lower than appropriate pH for extracting the lithium phosphate, and thus a lithium phosphate extraction rate may be lowered. In other words, since the crystallized filtrate has high pH, lithium may be recovered by increasingly adding an amount of the crystallized filtrate to the recovered high concentration phosphoric acid filtrate to adjust pH of the mixture into greater than or equal to 9.

However, when the lithium phosphate is obtained by mixing the recovered high concentration phosphoric acid filtrate and the crystallized filtrate in an appropriate ratio corresponding to a chemical equivalent and separately adding a basic material thereto to adjust pH into greater than or equal to 9.5, a lithium recovery rate may be improved compared with when the recovered high concentration phosphoric acid filtrate is only mixed with the crystallized filtrate to adjust pH into greater than or equal to 9.

The basic material adjusts pH of the mixture of the recovered high concentration phosphoric acid filtrate and the crystallization filtrate and may include for example at least one of sodium hydroxide, potassium hydroxide, calcium hydroxide, hydroxide barium, magnesium hydroxide, calcium oxide, lithium, potassium, and sodium.

Next, in the step of dissolving the solid-phase lithium sulfate in the solvent to obtain the lithium sulfate aqueous solution, the lithium hydroxide aqueous solution or the crystallization filtrate obtained during the step of concentrating the lithium hydroxide aqueous solution and crystallizing the same, may be added to the obtained lithium sulfate aqueous solution. In this way, the lithium sulfate aqueous solution may be purified by adding the lithium hydroxide aqueous solution or the crystallized filtrate to adjust pH of the lithium sulfate aqueous solution into greater than or equal to 10. Herein, the purified lithium sulfate aqueous solution may have pH of greater than or equal to 11.

In the present example embodiment, after controlling the pH of the lithium sulfate aqueous solution into greater than or equal to 10, cation impurities may be removed through a solid-phase separation from the lithium sulfate aqueous solution. In other words, when the pH of the lithium sulfate aqueous solution is adjusted as above, the cation impurities included in the initial lithium sulfate aqueous solution may be effectively reduced.

The cation impurities may be for example at least one selected from the group consisting of potassium (K), sodium (Na), magnesium (Mg), boron (B), and calcium (Ca) and may be specifically divalent cation impurities.

When the cation impurities are present in the lithium sulfate aqueous solution, an extract may be produced in the solution depending on an operating condition of the bipolar electrodialysis device. Herein, the extract may have a negative influence on a life-span of the ion exchange membrane of the bipolar electrodialysis device. Accordingly, the conversion process using the bipolar electrodialysis device may be more stably performed by controlling pH of the lithium sulfate aqueous solution added to the bipolar electrodialysis device to sharply reduce cation impurities of the lithium sulfate aqueous solution.

Then, pH of the purified lithium sulfate aqueous solution by controlling pH to remove impurities is adjusted again and added to the bipolar electrodialysis device. Herein, the pH may be adjusted for example by adding a desalted solution as shown in FIG. 13 to dilute lithium sulfate from which impurities are removed.

In other words, in an embodiment of the present invention, the pH of the lithium sulfate aqueous solution from which impurities are removed and which is put in the bipolar electrodialysis device may be adjusted into less than or equal to 3.5, a range for smoothly operating the bipolar electrodialysis device.

When the pH of the electrodialysis lithium sulfate aqueous solution put in the bipolar electrodialysis device including a bipolar membrane is greater than 3.5, an inverse diffusion through a dialysis membrane may happen. Then, the pH of the lithium sulfate aqueous solution put in the bipolar electrodialysis device is sharply increased up to greater than 11 and thus may halt the bipolar process.

Accordingly, a solution tank which is connected with the bipolar electrodialysis device and into which the lithium sulfate aqueous solution is supplied is managed to have initial pH of less than or equal to 3. When the pH of the solution tank is increased during the process, a small amount of a lithium sulfate aqueous solution with 30 g/L prepared in advance is added thereto to control the pH to be less than or equal to 3.

Herein, 30 g/L of the lithium sulfate is used to adjust pH and also as a raw solution to stably maintain the process without external inflow of an acid or generation of a byproduct.

The appropriate pH range for operating the bipolar electrodialysis device is the same as described above referring to FIGS. 3 and 4 and thus will be omitted here.

Meanwhile, the desalted solution converted by using the electrodialysis device may be reused as a solvent during the step of dissolving the solid-phase lithium sulfate in the solvent to obtain the lithium sulfate aqueous solution. Accordingly, this process uses no separate solvent and thus may be economical and also, recovers lithium remaining in the desalted solution during preparation of the lithium sulfate aqueous solution and thus may improve a lithium recovery rate.

In addition, the converted sulfuric acid aqueous solution by using the electrodialysis device may be concentrated and then, reused in the step of mixing lithium phosphate with sulfuric acid.

As forementioned, the sulfuric acid aqueous solution and the desalted solution produced from the bipolar electrodialysis device may be reused in the next batch and thus improve productivity of the lithium compound preparation process according to the present example embodiment.

In addition, when pH of the lithium sulfate aqueous solution is adjusted into greater than or equal to 10 after dissolving solid-phase lithium sulfate in a solvent, impurities of the sulfuric acid aqueous solution and the desalted solution produced through the bipolar electrodialysis process are also very reduced, and even when the sulfuric acid aqueous solution and the desalted solution are released through a wastewater treatment, a cost for the wastewater treatment may be reduced, and thus excellent economic feasibility may be secured.

Hereinafter, examples of the present invention and comparative examples are described. However, the following examples are merely an exemplary embodiment of the present invention, and the present invention is not limit thereto.

Example 1

A high concentration phosphoric acid filtrate was recovered through a solid/liquid separation after reacting lithium phosphate and sulfuric acid under a condition shown in Table 1. The result is shown in Table 2.

The lithium phosphate was lithium phosphate extracted from a waste battery and turned out to show a percentage of water content of 35% when its weight change was measured after dried at 105° C. for 24 hours. Components of the dried lithium phosphate were analyzed and measured through ICP (Inductively Coupled Plasma) to calculate an amount of sulfuric acid corresponding to 1 equivalent according to Reaction Scheme 1, and the used sulfuric acid had purity of 95%.

As for phosphoric acid for making the lithium phosphate into slurry, a phosphoric acid solution having a concentration of 30 to 50 wt % was used, and the phosphoric acid solution was prepared by mixing a phosphoric acid solution (Daejung Chemicals and Metals Co., Ltd.) and ultrapure water in a ratio of 85:15 (a phosphoric acid solution: ultrapure water).

The phosphoric acid solution and the lithium phosphate were mixed in a reactor and prepared into slurry, and sulfuric acid was added to the slurry while the slurry was stirred at 200 rpm. Herein, the sulfuric acid was added at a speed of about 10 g/min.

When the addition of the sulfuric acid was complete, the reactant slurry was additionally stirred for about 40 minutes and then, solid/liquid-separated through a common filtration under a reduced pressure, and herein, the pressure during the filtration was about 50 mbar. The recovered liquid sample was taken and component-analyzed through ICP, and the result is shown in Table 2.

As an experimental result, the recovered liquid turned out to be a phosphoric acid filtrate including phosphoric acid at a high concentration of 51 to 62 wt % and contain 6.5 to 11 g/L of lithium. A lithium content therein was inversely proportional to a sum of phosphorus (P) and sulfur (S) contents among components of the phosphoric acid.

TABLE 1

| Nos. | Concentration of phosphoric acid (wt %) | Amount phosphoric acid (g) | Lithium phosphate (g) Weight of water content | Lithium phosphate (g) Dry weight | Amount of 95 wt % $H_2SO_4$ (g) |
|---|---|---|---|---|---|
| Sample 1 | 30 | 200 | 483.95 | 315.1 | 421.4 |
| Sample 2 | 30 | 200 | 483.95 | 315.1 | 434.1 |
| Sample 3 | 50 | 200 | 241.98 | 157.6 | 210.7 |

TABLE 2

| | Components of recovery filtrate (g/L) | | | | | | | Phosphoric acid concentration in recovery filtrate | Li concentration | P + S concentration |
|---|---|---|---|---|---|---|---|---|---|---|
| Nos. | Li | Na | B | P | S | Ca | Mg | (wt %) | (mom/L) | (mol/L) |
| Sample 1 | 10.55 | 7.67 | 0.062 | 241.68 | 78.44 | 0.062 | 0.027 | 51.2 | 1.520 | 10.249 |
| Sample 2 | 11.15 | 8.47 | 0.059 | 243.83 | 72.35 | 0.068 | 0.026 | 51.1 | 1.606 | 10.129 |
| Sample 3 | 6.46 | 7.97 | 0.052 | 316.91 | 57.43 | 0.04 | 0.023 | 62.5 | 0.931 | 12.023 |

Example 2

Figure 6:
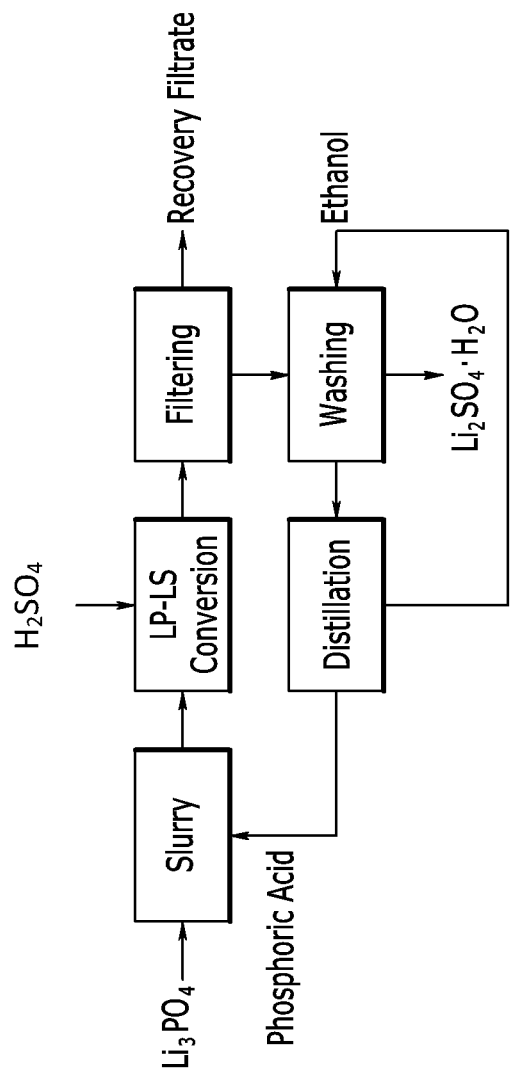
FIG. 6 is a process view showing a process according to Example 2.

FIG. 6 is a view showing a process according to Example 2. Specifically, it includes an ethanol washing step.

A high concentration phosphoric acid filtrate was recovered through a solid/liquid separation after reacting lithium phosphate and sulfuric acid under a condition shown in Table 3. In addition, a component analysis about washing water used for washing recovered lithium sulfate was performed. The results are shown in Tables 4, 5, and 6.

The lithium phosphate was lithium phosphate extracted from a waste battery and herein, used after dried at 105° C. for 24 hours to remove moisture therein in order to reduce an experiment error due to a percentage difference of water content. Components of the dried lithium phosphate were analyzed and measured through ICP (Inductively Coupled Plasma) to calculate an amount of sulfuric acid corresponding to an equivalent ratio according to Reaction Scheme 1, and the sulfuric acid had purity of 95%.

As for phosphoric acid for making to make the lithium phosphate into slurry, a phosphoric acid solution having a concentration of 21 to 30 wt % was used, and the phosphoric acid solution was prepared by mixing a phosphoric acid solution (Daejung Chemicals and Metals Co., Ltd.) and ultrapure water in a ratio of 85:15 (a phosphoric acid solution:ultrapure water).

The phosphoric acid solution and the lithium phosphate were mixed in a reactor and prepared into slurry, and sulfuric acid was added thereto while the slurry was stirred at 200 rpm. Herein, the sulfuric acid was added at a speed of about 10 g/min.

When the addition of the sulfuric acid was complete, the reactant slurry was additionally stirred for about 40 minutes and then, solid/liquid-separated through a filter under a reduced pressure, and herein, the pressure during the filtration was about 50 mbar.

A solid cake obtained after the solid/liquid separation was washed with ethanol, and herein, the washing was performed by uniformly spraying a predetermined amount of the ethanol on the solid cake while filtered under a reduced pressure. As for Sample 4, 500 g of ethanol was additionally sprayed after spraying 400 g of ethanol, and as for Samples 5 and 6, 500 g of ethanol was sprayed.

Components of the recovered phosphoric acid filtrate, the washing solution (ethanol), and the solid were analyzed by using ICP.

TABLE 3

| Nos. | Slurry phosphoric acid concentration (wt. %) | Amount of phosphoric acid (g) | Lithium phosphate (g) | Sulfuric acid (95 wt %) Equivalent ratio | Sulfuric acid (95 wt %) weight (g) |
|---|---|---|---|---|---|
| Sample 4 | 30 | 300 | 315 | 1.1 eq | 434 |
| Sample 5 | 21 | 300 | 315 | 1.0 eq | 394 |
| Sample 6 | 21 | 300 | 315 | 1.1 eq | 433 |

TABLE 4

| Nos. | Components of recovery filtrate (g/L) | | | | | | Density (g/cc) | phosphoric acid concentration in recovery filtrate (wt %) | Recovery amount (g) | Li concentration (mom/L) | P + S concentration (mom/L) |
| --- | --- | --- | --- | --- | --- | --- | --- | --- | --- | --- | --- |
| | Li | Na | P | S | Ca | Mg | | | | | |
| Sample 4 | 7.4 | 7.64 | 261.85 | 77.16 | 0.054 | 0.027 | 1.5248 | 54.3 | 335.46 | 1.066 | 10.860 |
| Sample 5 | 12.1 | 7.98 | 235.23 | 51.89 | 0.11 | 0.027 | 1.5191 | 49 | 363.81 | 1.743 | 9.213 |
| Sample 6 | 9.89 | 7.85 | 225.48 | 78.68 | 0.072 | 0.026 | 1.5619 | 45.8 | 300.87 | 1.425 | 9.733 |

TABLE 5

| Nos. | Components of washing solution (ethanol) (g/L) | | | | | | Addition amount (g) | Recovery amount (g) |
| --- | --- | --- | --- | --- | --- | --- | --- | --- |
| | Li | Na | P | S | Ca | Mg | | |
| Sample 4 | 0.458 | 0.101 | 58.72 | 12.18 | <0.003 | 0.006 | 400 | 229.82 |
| | 0.259 | 0.027 | 21.81 | 4.24 | <0.003 | 0.003 | 500 | 439.43 |
| Sample 5 | 0.678 | 0.133 | 55.39 | 3.69 | <0.003 | 0.008 | 500 | 575.60 |
| Sample 6 | 0.559 | 0.087 | 45.88 | 9.13 | <0.003 | 0.006 | 500 | 583.41 |

TABLE 6

| Nos. | Solid components (wt. %) | | | | | | Precipitation amount (g) | Percentage of water content (%) |
| --- | --- | --- | --- | --- | --- | --- | --- | --- |
| | Li | Na | P | S | Ca | Mg | | |
| Sample 4 | 10.13 | 0.21 | 0.76 | 24.68 | 0.0082 | 0.0006 | 496.79 | 8.5 |
| Sample 5 | 10.10 | 0.15 | 1.25 | 24.61 | 0.0038 | <0.001 | 521.08 | 12.2 |
| Sample 6 | 10.31 | 0.12 | 0.78 | 25.35 | 0.0016 | <0.001 | 575.24 | 21.9 |

As an experimental result, the recovered liquid turned out to be a high concentration phosphoric acid filtrate including phosphoric acid with a concentration of 45 to 54 wt %, and 7.5 to 12.1 g/L of lithium was contained therein. In addition, a lithium content was inversely proportional to a sum of phosphorus (P) and sulfur (S) contents among components of the phosphoric acid. In the washing solution (ethanol), P was present in an amount of 45 to 59 g/L, S was present in an amount of 3.7 to 12.2 g/L, and other elements including lithium were present in an amount of less than or equal to 1 g/L. The solid included lithium and sulfur as a main component but P in an amount of about 0.76 to 1.25 wt %, and thus greater than or equal to 90% of P was recovered as the high concentration phosphoric acid filtrate and the washing solution (ethanol).

Example 3

Figure 7:
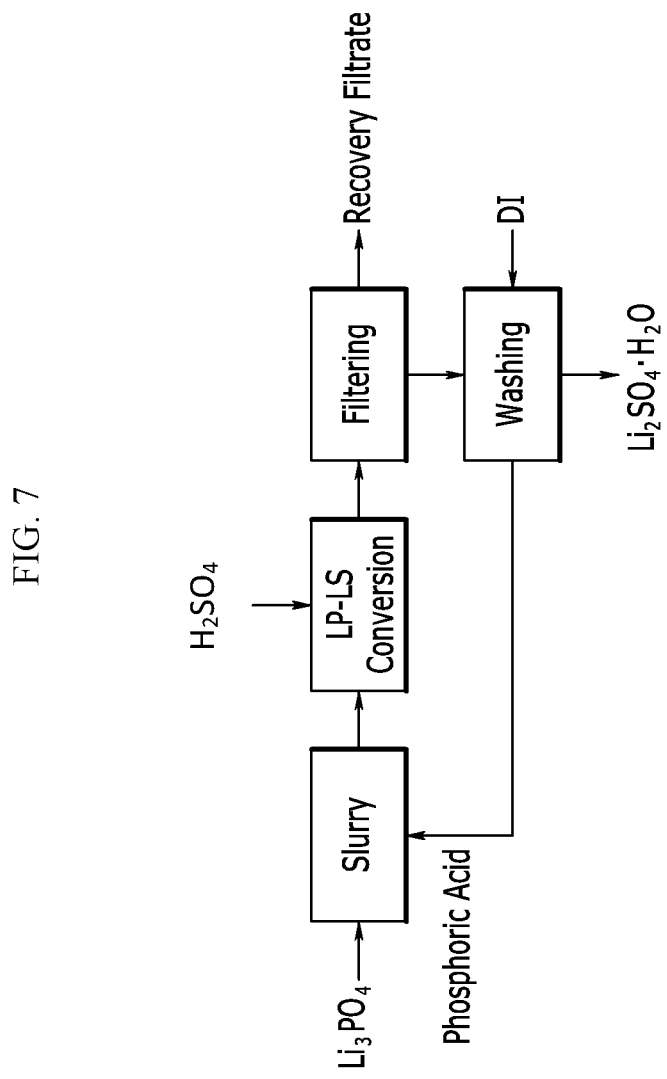
FIG. 7 is a process view showing processes according to Examples 3 and 5.

FIG. 7 is a view showing a process according to Example 3. Specifically, it includes a washing step with pure water.

Lithium phosphate and sulfuric acid were reacted under a condition shown in Table 7 and then solid/liquid separated to recover high concentration phosphoric acid. In addition, a component analysis about a washing solution used for washing the recovered lithium sulfate was performed. The results are shown in Tables 8, 9, and 10.

The lithium phosphate was lithium phosphate extracted from a waste battery and used after dried at 105° C. for 24 hours to remove moisture therein in order to reduce an experiment error due to a percentage difference of water content. Components of the dried lithium phosphate were analyzed through ICP (Inductively Coupled Plasma) to calculate an amount of sulfuric acid corresponding to an equivalent ratio according to Reaction Scheme 1, and the sulfuric acid had purity of 95%.

As for phosphoric acid for making the lithium phosphate into slurry, a phosphoric acid solution having a concentration of 21 to 30 wt % was used, and the phosphoric acid solution was prepared by mixing a phosphoric acid solution (Daejung Chemicals and Metals Co., Ltd.) and ultrapure water in a ratio of 85:15 (a phosphoric acid solution: ultrapure water).

The phosphoric acid solution and the lithium phosphate were mixed in a reactor and prepared into slurry, and sulfuric acid was added thereto while the slurry was stirred at 200 rpm. Herein, the sulfuric acid was added at a speed of about 10 g/min.

When the addition of the sulfuric acid was complete, the reactant slurry was additionally stirred for 40 minutes and then, solid/liquid-separated through a filtration under a reduced pressure, and the pressure during the filtration was about 50 mbar.

After the solid/liquid separation, a solid cake obtained therefrom was washed with water (ultrapure water), and the washing was performed by uniformly spraying a predetermined amount of the water on the solid cake while filtered under a reduced pressure.

Components of the recovered phosphoric acid and the washing solution were analyzed by using ICP, and components of the solid were also analyzed by using ICP after the solid was dried at 105° C. for 24 hours.

TABLE 7

| Nos. | Slurry phosphoric acid concentration (wt. %) | Amount of phosphoric acid (g) | Lithium phosphate (g) | Sulfuric acid (95 wt %) Equivalent ratio | weight (g) |
|---|---|---|---|---|---|
| Sample 7 | 21 | 300 | 315 | 1.0 eq | 394 |
| Sample 8 | 30 | 300 | 315 | 1.0 eq | 394 |

TABLE 8

| Nos. | Components of recovery filtrate (g/L) | | | | | | Density (g/cc) | Phosphoric acid concentration in recovery filtrate (wt %) | Recovery amount (g) | Li concentration (mom/L) | P + S concentration (mom/L) |
|---|---|---|---|---|---|---|---|---|---|---|---|
| | Li | Na | P | S | Ca | Mg | | | | | |
| Sample 7 | 9.9 | 7.92 | 237.75 | 49.48 | 0.078 | 0.029 | 1.5191 | 49.5 | 355.48 | 1.426 | 9.219 |
| Sample 8 | 8.65 | 7.95 | 295.52 | 45.53 | 0.079 | 0.03 | 1.5619 | 59.9 | 287.4 | 1.246 | 10.961 |

TABLE 9

| Nos. | Components of recovered washing solution (g/L) | | | | | | Addition amount (g) | Recovery amount (g) | Phosphoric acid concentration (%) | Li concentration (mom/L) | P + S concentration (mom/L) |
|---|---|---|---|---|---|---|---|---|---|---|---|
| | Li | Na | P | S | Ca | Mg | | | | | |
| Sample 7 | 23.84 | 4.7 | 116.01 | 70.11 | 0.041 | 0.014 | 200 | 329.81 | 26.7 | 3.435 | 5.932 |
| Sample 8 | 21.2 | 4.88 | 146.88 | 63.96 | 0.043 | 0.015 | 200 | 423.69 | 33.4 | 3.054 | 6.737 |

TABLE 10

| Nos. | Solid components (wt. %) | | | | | | Precipitation amount (g) | Percentage of water content (%) |
|---|---|---|---|---|---|---|---|---|
| | Li | Na | P | S | Ca | Mg | | |
| Sample 7 | 11.06 | 0.058 | 0.68 | 28.60 | 0.0042 | <0.0010 | 414.85 | 18.2 |
| Sample 8 | 11.14 | 0.034 | 0.47 | 28.51 | 0.0020 | <0.0005 | 385.53 | 15.4 |

As an experimental result, the recovered liquid turned out to be a phosphoric acid filtrate having a high concentration of 49 to 59 wt % and contain 8.7 to 9.8 g/L of lithium. A lithium content was inversely proportional to a sum of phosphorus (P) and sulfur (S) contents among components of the phosphoric acid. In the washing solution, P was present in an amount of 116 to 147 g/L, S in an amount of 64 to 70 g/L, and lithium was included in an amount of 21.2 to 23.5 g/L which was inversely proportional to an amount sum of the phosphorus (P) and the sulfur (S).

The solid included lithium and sulfur as a component but P in an amount of 0.52 to 1.09 wt %, and thus greater than or equal to 90% of P was recovered as the high concentration phosphoric acid filtrate and the washing solution.

Example 4

The washing solution recovered from Sample 7 was used to test a process cycle.

The washing solution obtained in Sample 7 was used again to make lithium phosphate into slurry, and this cycle was twice repeated.

The results are shown in Table 11.

TABLE 11

| Cycle Nos. | Materials | Input (g) | | | Output (g) | | | | |
|---|---|---|---|---|---|---|---|---|---|
| | | $Li_3PO_4$ | Circulated $H_3PO_4$ | Total | $Li_2SO_4H_2O$ | | Recovered $H_3PO_4$ | | Circulated $H_3PO_4$ |
| $1^{st}$ | Li | 53.1 | 0 | 53.1 | 44.6 | 84% | 2.32 | 4.4% | 5.72 |
| | P | 77.1 | 18.0 | 95.1 | 1.57 | 1.7% | 55.6 | 59% | 27.9 |

TABLE 11-continued

| Cycle Nos. | Materials | Input (g) Li₃PO₄ | Input (g) Circulated H₃PO₄ | Total | Output (g) Li₂SO₄H₂O | | Output (g) Recovered H₃PO₄ | | Output (g) Circulated H₃PO₄ |
|---|---|---|---|---|---|---|---|---|---|
| 2ⁿᵈ | Li | 47.8 | 5.20 | 53.0 | 46.0 | 96% | 1.21 | 2.5% | 5.80 |
|  | P | 69.4 | 25.3 | 94.7 | 4.06 | 5.9% | 65.1 | 94% | 25.5 |
| 3ʳᵈ | Li | 45.6 | 5.65 | 51.3 | 44.0 | 98% | 0.67 | 1.3% | 6.63 |
|  | P | 66.3 | 24.8 | 91.1 | 4.47 | 4.9% | 65.0 | 96% | 22.9 |

As a result, when the processed were continuously performed, P was recovered at a rate of 94 to 96%, and Li was recovered at a rate of 96 to 98%.

Example 5

The same process as shown in FIG. 7 was performed in Example 5. Example 5 included a continuous process of reusing a washing solution used in the former cycle, even though separately marked in the drawing.

Lithium phosphate and sulfuric acid were reacted under a condition shown in Table 12 and solid/liquid separated to recover high concentration phosphoric acid. In addition, components of a washing solution used to wash the recovered lithium sulfate were analyzed. The results are shown in Tables 13, 14, and 15.

The lithium phosphate was lithium phosphate extracted from a waste battery and used after dried at 105° C. for 24 hours to remove moisture in order to reduce a test error due to a percentage difference of water content. Components of the dried lithium phosphate were analyzed and measured through ICP (Inductively Coupled Plasma) to calculate an amount of sulfuric acid corresponding to an equivalent ratio according to Reaction Scheme 1, and the sulfuric acid had purity of 95%.

As for phosphoric acid used for making the lithium phosphate into slurry, a washing solution recovered from the former cycle was used and had a concentration of 26 to 26.5 wt %.

The phosphoric acid solution and the lithium phosphate were mixed in a reactor and prepared into slurry, and sulfuric acid was added thereto while the slurry was stirred at 200 rpm. Herein, the sulfuric acid was added at a speed of about 10 g/min.

When the addition of the sulfuric acid was complete, the reactant slurry was additionally stirred for about 40 minutes and then, solid/liquid-separated through a filtration under a reduced pressure, and the pressure during the filtration was about 50 mbar.

A solid cake obtained after the solid/liquid separation was washed with water (ultrapure water), and the washing was performed by uniformly spraying a required amount of water on the cake while filtered under a reduced pressure.

The recovered phosphoric acid and the washing solution were component-analyzed by using ICP, and the solid was also component-analyzed by using ICP after dried at 105° C. for 24 hours.

TABLE 12

| Nos. | Slurry phosphoric acid | Phosphoric acid concentration of slurry (wt. %) | Amount of phosphoric acid (g) | Lithium phosphate (g) | Sulfuric acid (95 wt %) weight (g) |
|---|---|---|---|---|---|
| Sample 10 | Recovered washing solution of Sample 7 | 26 | 296.79 | 274.14 | 335.02 |
| Sample 11 | Recovered washing solution of Sample 10 | 26.5 | 296.79 | 270.9 | 332 |

TABLE 13

| Nos. | Components of recovery filtrate (g/L) Li | Na | P | S | Ca | Mg | Density (g/cc) | Phosphoric acid concentration in recovery filtrate (wt %) | Recovery amount (g) | Li concentration (mom/L) | P + S concentration (mom/L) |
|---|---|---|---|---|---|---|---|---|---|---|---|
| Sample 10 | 6.93 | 7.92 | 319.42 | 49.48 | 0.078 | 0.029 | 1.603 | 63.0 | 280.55 | 0.998 | 11.856 |
| Sample 11 | 6.64 | 13.9 | 335.03 | 50.94 | 0.039 | 0.044 | 1.6135 | 65.7 | 262.97 | 0.957 | 12.405 |

TABLE 14

| Nos. | Components of recovered washing solution (g/L) | | | | | | Addition amount (g) | Recovery amount (g) | Phosphoric acid concentration (%) | Li concentration (mom/L) | P + S concentration (mom/L) |
|---|---|---|---|---|---|---|---|---|---|---|---|
| | Li | Na | P | S | Ca | Mg | | | | | |
| Sample 10 | 25.79 | 5.61 | 113.45 | 71.81 | 0.072 | 0.015 | 200 | 305.09 | 26.5 | 3.716 | 5.902 |
| Sample 11 | 24.95 | 6.06 | 110.01 | 71.98 | 0.076 | 0.015 | 200 | 334.05 | 25.5 | 3.595 | 5.797 |

TABLE 15

| Nos. | Solid components (wt. %) | | | | | | Precipitation amount (g) | Percentage of water content (%) |
|---|---|---|---|---|---|---|---|---|
| | Li | Na | P | S | Ca | Mg | | |
| Sample 10 | 12.02 | 0.092 | 1.19 | 29.35 | 0.0038 | <0.0005 | 440.52 | 22.52 |
| Sample 11 | 10.58 | 0.089 | 1.03 | 27.14 | 0.0038 | <0.0010 | 406.2 | 18.7 |

As an experiment result, a liquid recovered through a continuous process of using a washing solution used in the former cycle turned out to be a phosphoric acid filtrate having a high concentration of 63 to 65.7 wt % and contain 6.9 to 6.6 g/L of lithium. The lithium content was inversely proportional to a sum of phosphorus (P) and sulfur (S) contents among components of the phosphoric acid.

In the washing solution, P was present in an amount of 110 to 113 g/L, S in an amount of 72 g/L, and lithium was included in an amount of 25 to 25.8 g/L which is inversely proportional to a sum of the phosphorus (P) and sulfur (S) contents among components of the washing solution. The solid included lithium and sulfur as a main component but P in an amount of 1.03 to 1.19 wt %, and thus greater than or equal to 90% of P was recovered as the phosphoric acid solution and the washing solution.

This result shows that a continuous process of reusing a washing solution used in the former cycle as shown in FIG. 3 was stably realized.

Example 6

Figure 8:
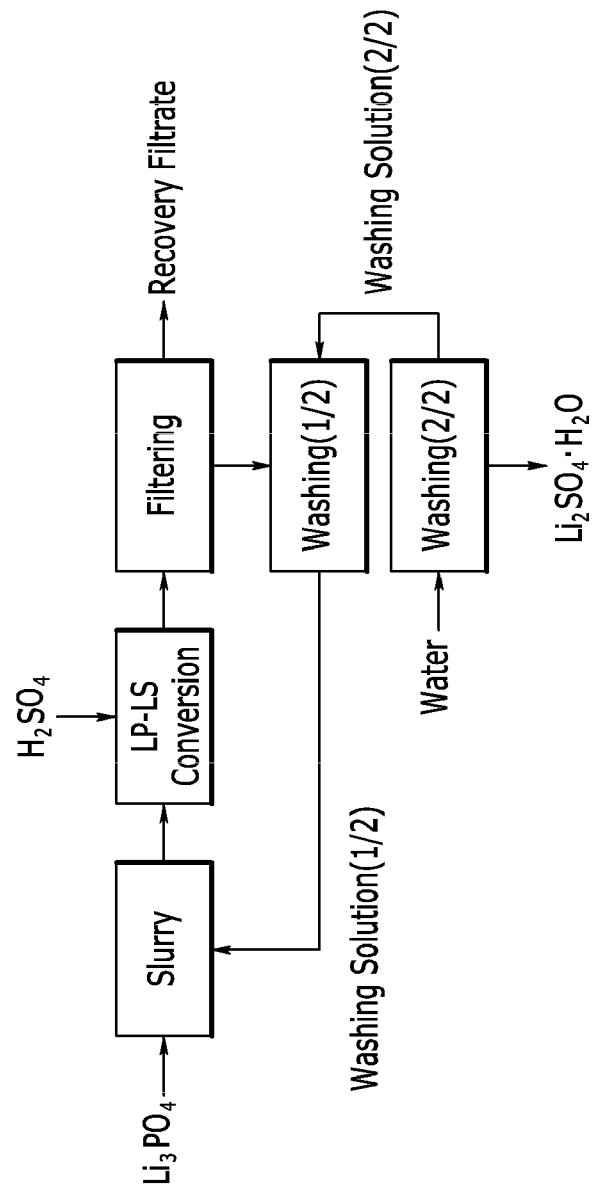
FIG. 8 is a process view showing a process according to Example 6.

FIG. 8 is a process view showing a process according to Example 6. Specifically, the view shows a continuous process of greater than or equal to twice repeating the washing.

Lithium phosphate and sulfuric acid were reacted under a condition shown in Table 16 and solid/liquid separated to recover high concentration phosphoric acid. In addition, a washing solution used for washing the recovered lithium sulfate was component-analyzed. The results are shown in Tables 17, 18, and 19.

The lithium phosphate was lithium phosphate extracted from a waste battery and used after dried at 105° C. for 24 hours to remove moisture in order to reduce a test error due to a percentage difference of water content. Components of the dried lithium phosphate were analyzed and measured through ICP (Inductively Coupled Plasma) to calculate an amount of sulfuric acid corresponding to an equivalent ratio according to Reaction Scheme 1, and the sulfuric acid had purity of 70%.

As for Samples 12, 13, and 14, a 40 wt % phosphoric acid solution was used as phosphoric acid for making the lithium phosphate into slurry, and the phosphoric acid solution was prepared by mixing an 85% phosphoric acid solution (Daejung Chemicals and Metals Co., Ltd.) and ultrapure water. As for Sample 15, a recovered washing solution obtained from Sample 8 was used as the phosphoric acid for making the lithium phosphate into slurry, and the specific composition of the recovered washing solution is shown in Table 9.

The phosphoric acid solution and the lithium phosphate were mixed in a reactor and prepared into slurry, and sulfuric acid was added thereto while stirred at 200 rpm. Herein, the sulfuric acid was added at a speed of about 10 g/min.

When the addition of the sulfuric acid was complete, the reactant slurry was additionally stirred for about 40 minutes and then, solid/liquid separated through a filtration under a reduced pressure, and the pressure under the filtration was about 50 mbar.

A solid cake after the solid/liquid separation was washed through two washing steps 1/2 and 2/2, and specifically, ultrapure water was used in the washing step 2/2, and a recovered washing solution from the washing step 2/2 of the former cycle was used in the step 1/2.

However, as for Sample 9, ultrapure water was used in all the washing steps 1/2 and 2/2. The reason is that there was no recovered washing solution in the first cycle of a continuous process.

The washing was performed by uniformly spraying a predetermined amount of water on a cake while filtered under a reduced pressure.

The recovered phosphoric acid and the washing solution were component-analyzed by using ICP, and the solid was also component-analyzed by using ICP after dried at 105° C. for 24 hours.

TABLE 16

| Nos. | Slurry phosphoric acid | Slurry phosphoric acid concentration (wt %) | Amount of phosphoric acid (g) | Ultrapure water (g) | Lithium phosphate (g) | Sulfuric acid (70 wt %) (g) |
|---|---|---|---|---|---|---|
| Sample 12 | reagent | 40 | 150 | 122 | 315 | 535 |
| Sample 13 | reagent | 40 | 150 | 122 | 315 | 545.7 |
| Sample 14 | reagent | 40 | 106 | 102 | 265 | 472 |
| Sample 15 | recovered washing solution of Sample 8 | 33.4 | 168 | 109 | 280 | 475.6 |

TABLE 17

| Nos. | Components of recovery filtrate (g/L) | | | | | | Density (g/cc) | Phosphoric acid concentration in recovery filtrate (wt %) | Recovery amount (g) | Li concentration (mom/L) | P + S concentration (mom/L) |
|---|---|---|---|---|---|---|---|---|---|---|---|
| | Li | Na | P | S | Ca | Mg | | | | | |
| Sample 12 | 16.53 | 7.42 | 190.80 | 56.29 | 0.047 | 0.013 | 1.4229 | 42.4 | 506.6 | 2.382 | 8.549 |
| Sample 13 | 15.92 | 7.78 | 182.15 | 68.71 | 0.051 | 0.018 | 1.4387 | 40.1 | 575.5 | 2.294 | 8.024 |
| Sample 14 | 15.12 | 7.72 | 186.49 | 76.38 | 0.049 | 0.018 | 1.4493 | 40.7 | 536.3 | 2.178 | 8.198 |
| Sample 15 | 15.63 | 10.31 | 185.71 | 69.44 | 0.067 | 0.023 | 1.4534 | 40.4 | 508.7 | 2.252 | 7.404 |

TABLE 18

| Nos. | Washing step | Added washing water | Amount of added washing water (g) | Components of recovered washing water (g/L) | | | | | | Amount of recovered washing water (g) | Density (g/cc) | Phosphoric acid concentration (wt %) | Li concentration (mom/L) | P + S concentration (mom/L) |
|---|---|---|---|---|---|---|---|---|---|---|---|---|---|---|
| | | | | Li | Ca | S | Mg | Na | P | | | | | |
| Sample 12 | 1/2 | Ultrapure water | 100 | 21.53 | 0.036 | 64.48 | 0.009 | 6.33 | 147.70 | 169 | 1.383 | 33.8 | 3.102 | 6.779 |
| | 2/2 | Ultrapure water supplement | 100 | 35.04 | 0.006 | 84.33 | <0.003 | 1.61 | 26.45 | 189 | 1.269 | 6.6 | 5.048 | 3.484 |
| Sample 13 | 1/2 | Recovered washing water of 2/2 of Sample 12 | 125 | 20.95 | 0.039 | 74.02 | 0.014 | 6.13 | 133.97 | 120 | 1.393 | 30.4 | 3.018 | 6.634 |
| | 2/2 | Ultrapure water supplement | 100 | 32.97 | 0.015 | 88.22 | 0.005 | 2.41 | 46.52 | 138 | 1.305 | 11.3 | 4.750 | 4.253 |
| Sample 14 | 1/2 | Recovered washing water of 2/2 of Sample 13 | 143 | 16.7 | 0.052 | 75.00 | 0.021 | 8.07 | 173.26 | 73 | 1.375 | 39.9 | 2.406 | 7.933 |
| | 2/2 | Ultrapure water supplement | 100 | 33.29 | 0.019 | 92.98 | 0.007 | 3.23 | 60.16 | 157 | 1.306 | 14.6 | 4.796 | 4.842 |
| Sample 15 | 1/2 | Recovered washing water of 2/2 of Sample 14 | 130 | 22.15 | 0.048 | 77.23 | 0.017 | 7.8 | 140.54 | 96 | 1.462 | 30.4 | 3.191 | 6.946 |
| | 2/2 | Ultrapure water supplement | 100 | 29.94 | 0.021 | 82.93 | 0.007 | 3.17 | 54.08 | 151 | 1.260 | 13.6 | 4.313 | 4.332 |

TABLE 19

| Nos. | Solid components (wt. %) | | | | | | Precipitation amount (g) | Percentage of water content (%) |
| --- | --- | --- | --- | --- | --- | --- | --- | --- |
| | Li | Na | P | S | Ca | Mg | | |
| Sample 12 | 10.84 | 0.11 | 1.74 | 28.45 | 0.0017 | <0.0010 | 463.2 | 25.29 |
| Sample 13 | 10.89 | 0.076 | 1.15 | 27.43 | 0.0080 | <0.0010 | 447.4 | 25.12 |
| Sample 14 | 10.21 | 0.059 | 0.80 | 25.82 | 0.0015 | <0.0010 | 358.98 | 26.68 |
| Sample 15 | 10.08 | 0.078 | 0.98 | 25.75 | <0.0010 | <0.0010 | 420.37 | 24.91 |

As an experimental result, the washing was performed through two washing steps 1/2 and 2/2, a process of FIG. 4 using a washing solution recovered from a washing step 2/2 of the former cycle in the washing step 1/2 may obtain a washing 1/2-recovered washing solution including phosphoric acid with a concentration of 30 to 40 wt % and a washing 2/2-recovered washing solution including phosphoric acid with a concentration of 15 to 7 wt %.

The solid included lithium and sulfur as a main components but P in an amount of 0.80 to 1.74 wt %, and thus greater than or equal to 90% of P was recovered as a phosphoric acid solution and a washing solution.

Referring to the results of Examples 1, 2, 3, and 5, as phosphoric acid for making lithium phosphate into slurry had a higher concentration, the phosphoric acid was recovered at a higher concentration, and in Example 6, a continuous process of including two washing steps and reusing a washing solution recovered from the former cycle as the phosphoric acid for making lithium phosphate into slurry turned out to obtain high concentration-recovered phosphoric acid.

Phosphorus, sulfur, and lithium components of the recovered phosphoric acid and washing solution in Examples 1, 2, 3, 5, and 6 have relationship as follow;

> Lithium concentration=0.048*(P concentration+S concentration)$^2$−1.2773*(P concentration+S concentration)+9.4367±0.6 was satisfied and units of the lithium solubility, the P concentration, and the S concentration are mol/L.

Example 7

Figure 9:
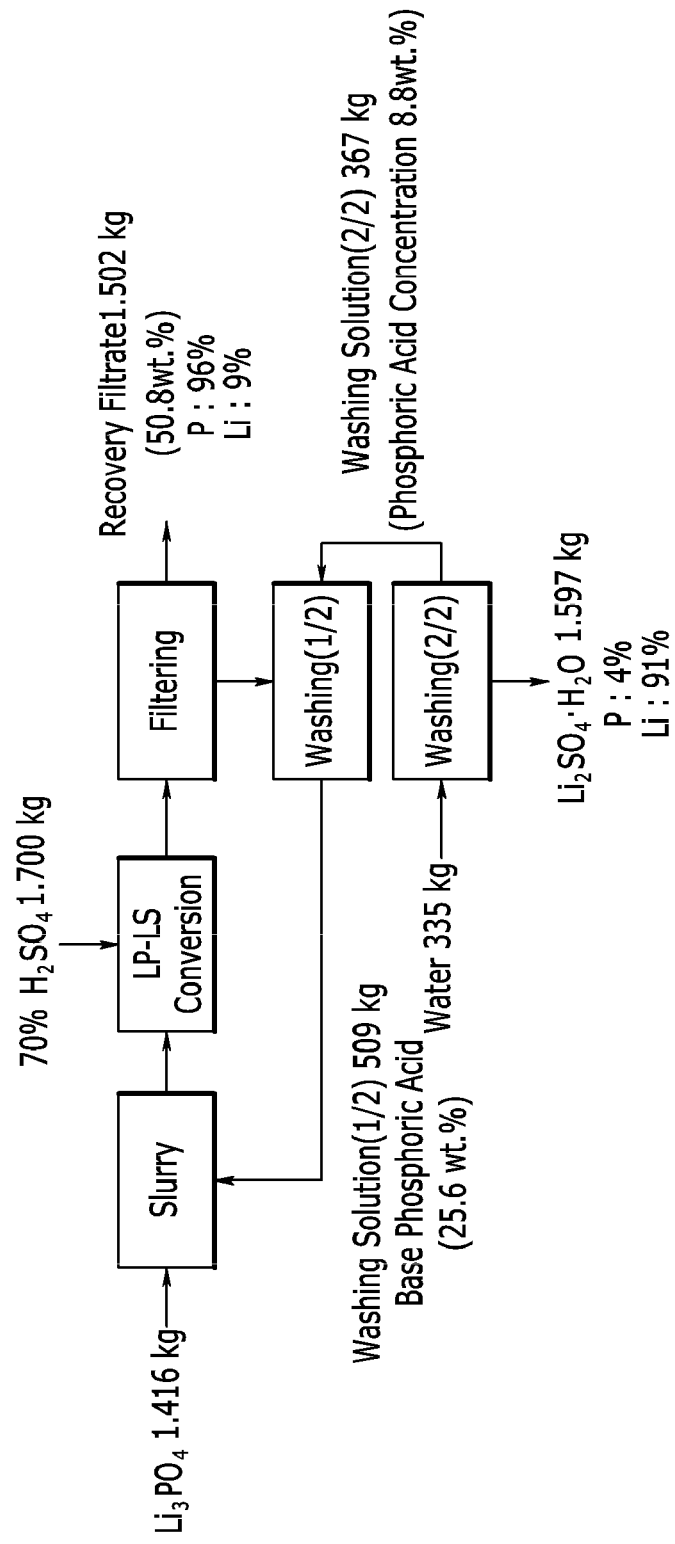
FIG. 9 is a process view showing a process according to Example 7.

FIG. 9 is a view showing a process according to Example 7. Specifically, a continuous process of performing greater than or equal to 2 cycles of the washing step is shown. A process of washing a solid cake after a solid/liquid separation was performed through two washing steps 1/2 and 2/2, and herein, the washing step 2/2 used ultrapure water, and the washing step 1/2 used a washing solution recovered from the washing step 2/2 of the former cycle.

The washing was performed by uniformly spraying a predetermined amount of water on the cake while filtered under a reduced pressure.

An amount of lithium phosphate put in each step, a concentration and an amount of sulfuric acid, an amount of recovered phosphoric acid, and an amount of phosphoric acid included in a washing solution are shown in FIG. 9.

Example 8

A lithium hydroxide aqueous solution was prepared by using a raw material of a lithium sulfate aqueous solution the devised bipolar electrodialysis.

When an initial solution used herein had a lithium concentration ranging from 7.1 g/L to 17.3 g/L, a lithium conversion rate obtained therefrom (manufacture lithium hydroxide) was in a range of 94.5 to 96.1%, and an S conversion rate (manufacture of sulfuric acid) was in a range of 96.8 to 97.8%, and accordingly, since a lithium concentration change of the raw solution had a very small influence on the lithium and sulfur conversion rates, the lithium and sulfur conversion rates turned out to be maintained regardless of the initial concentration.

TABLE 20

| | | Li conversion rate (%) | S conversion rate (%) |
| --- | --- | --- | --- |
| Li initial concentration | 17.3 g/L | 96.1 | 97.8 |
| | 12.5 g/L | 94.7 | 97.8 |
| | 7.1 g/L | 94.5 | 96.8 |

Figure 10:
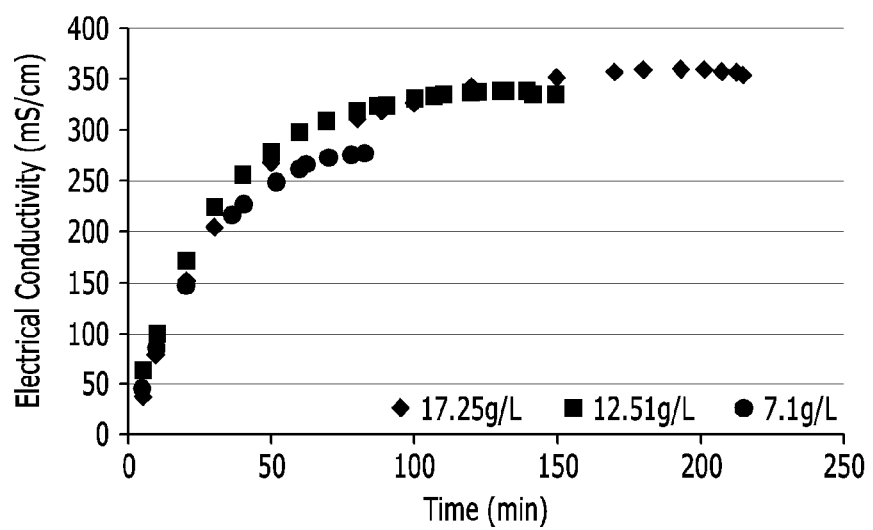
FIGS. 10 and 11 show experimental results of Example 8.
Figure 11:
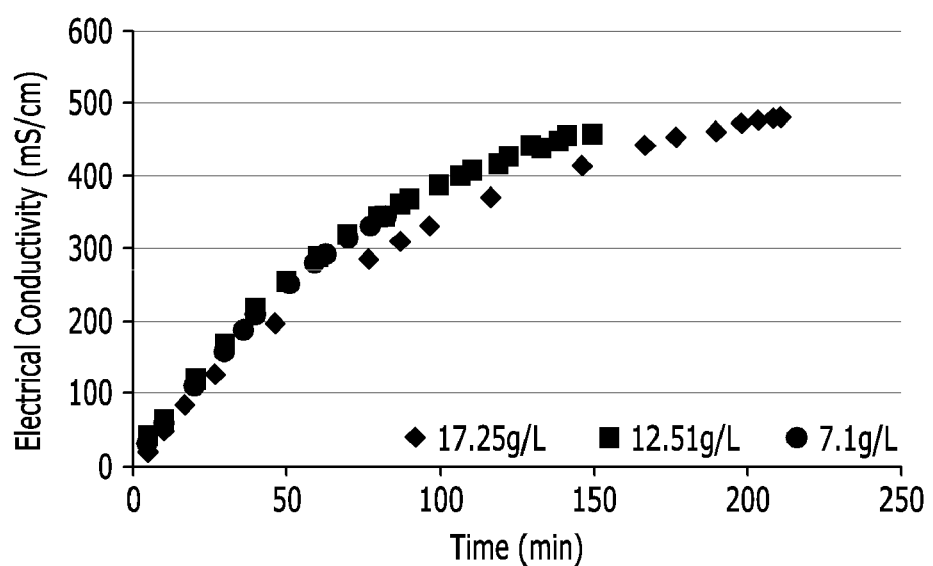

Experimental results are shown in FIGS. 10 and 11.

First of all, FIG. 10 shows a concentration change of lithium hydroxide obtained from a bipolar electrodialysis process, and FIG. 11 shows a concentration change of sulfuric acid obtained therefrom.

Herein, since a concentration of lithium may not be quantified in real time during the process, and thus the process may be controlled in real time by quantifying a lithium concentration in a lithium hydroxide aqueous solution obtained by using an increase of electric conductivity according to an increase of lithium ions, a concentration change depending on time is shown as a conductivity change depending on time.

In other words, the electric conductivity in Tables indicates a lithium concentration change about lithium hydroxide and a concentration change of a sulfuric acid solution about a sulfuric acid aqueous solution.

In FIG. 10, green dots show a lithium concentration of 7 g/L in an initially-added lithium sulfate aqueous solution, red dots show 12 g/L, and blue dots show 17.25 g/L, and in general, when the initially-added solutions are used in the same amount, a finally-obtained lithium concentration is determined by an initial lithium concentration difference, and thus a final concentration should be higher when the initial concentration is 17 g/L than 7 g/L.

However, an initial moving speed of ions may be the same regardless of a concentration as shown in FIG. 10 according to an example embodiment of the present invention, and resultantly, an actual lithium concentration change about three concentration changes shows almost the same trend (a slope and a general shape).

The result shows that lithium hydroxide may be obtained regardless of an initial concentration, and herein, as for the green dots, that is, the low lithium concentration, when there were no more moving lithium ions, a reaction was stopped and ended at about 90 minutes.

However, when a raw solution at a high concentration (30 g/L) is input to continuously supply ions and deteriorate pH as devised in the present invention, the reaction may be continued. Example of FIG. 10 confirms this reaction result without additionally resupplying the initial solution, and herein, a lithium concentration of the initial solution was maintained during movement of lithium ions in the solution by using electrical energy.

FIG. 11 shows that during a process of recovering sulfuric acid simultaneously with the lithium hydroxide, an ion movement of sulfur (S or $SO_4^{2-}$) like the aforementioned lithium ions had no correlation with its initial concentration change.

Resultantly, Examples of FIGS. 10 and 11 show that a concentration change range of the initially-added lithium sulfate aqueous solutions was widely maintained, and when a small amount of a high concentration lithium sulfate solution (30 g/L) was added whenever a lithium concentration of the initial solution was deteriorated during the process, the process might be stably managed.

Comparative Example 1

A composition and density of a commercially available phosphoric acid solution depending on a concentration are as follows. In general, an element such as Li is infinitesimally included in phosphoric acid, and technology of controlling an amount of Li through an amount of P+S has not been reported.

Table 21 shows a component change of commercially available phosphoric acid (Daejung Chemicals and Metals Co., Ltd.) depending on a concentration.

TABLE 21

| | | Components (mg/L) | | | | | | | |
|---|---|---|---|---|---|---|---|---|---|
| | | P | Mg | Ca | B | Li | $SO_4$ | Na | Specific gravity |
| Commercially available phosphoric acid solution | 31.76 wt. % | 117,100 | <5 | <5 | <5 | <5 | <5 | <5 | 1.205 |
| | 50 wt. % | 203,500 | <5 | <5 | <5 | <5 | <5 | <5 | 1.3368 |
| | 60 wt. % | 263,200 | <5 | <5 | <5 | <5 | <5 | <5 | 1.427 |
| | 70 wt. % | 342,900 | <5 | <5 | <5 | <5 | <5 | <5 | 1.5194 |
| | 80 wt. % | 413,300 | <5 | <5 | <5 | <5 | <5 | <5 | 1.6233 |

Experimental Example 1

In Examples 1, 2, 3, 5, and 6, phosphorous, sulfur, and lithium components in the recovered phosphoric acid and washing solution satisfied the following relationship Lithium concentration=0.048*(P concentration+S concentration)$^2$−1.2773*(P concentration+S concentration)+9.4367±0.6, and units of the lithium solubility, the P concentration, and the S concentration are mol/L.

When this equation was used to separate lithium phosphate into lithium sulfate and phosphoric acid to recover Li, Li was recovered in the following ratio between solid and liquid phases, which are shown in Table 22. In the calculation, the lithium phosphate has a theoretical Chemical Formula ($Li_3PO_4$) but no impurities except for $Li^+$ and $PO_4^{3-}$, no additional phosphoric acid and water are added to the lithium phosphate to make it into slurry, sulfuric acid added thereto has purity of 100%, and a S concentration of the recovered phosphoric acid is supposed to be 50 g/L.

TABLE 22

| P concentration (mol/L) in recovery filtrate | S concentration (mol/L) in recovery filtrate | P + S concentration (mol/L) in recovery filtrate | Li recovery rate | |
|---|---|---|---|---|
| | | | Solid phase ($Li_2SO_4$) | Liquid phase (recovered phosphoric acid) |
| 10 | 1.56 | 11.56 | 89% | 11% |
| 9 | 1.56 | 10.56 | 86% | 14% |
| 8 | 1.56 | 9.56 | 80% | 20% |
| 7 | 1.56 | 8.56 | 71% | 29% |
| 6 | 1.56 | 7.56 | 58% | 42% |
| 5 | 1.56 | 6.56 | 38% | 62% |
| 4 | 1.56 | 5.56 | 5% | 95% |
| 3 | 1.56 | 4.56 | 0% | 100% |

As shown in the aforementioned results, at least greater than or equal to 5 mol/L of a P+S concentration is necessarily required through theoretical calculation in order to obtain a solid-phase lithium sulfate by separating lithium phosphate into lithium sulfate and phosphoric acid.

Preparation Examples 1 to 5

Figure 12:
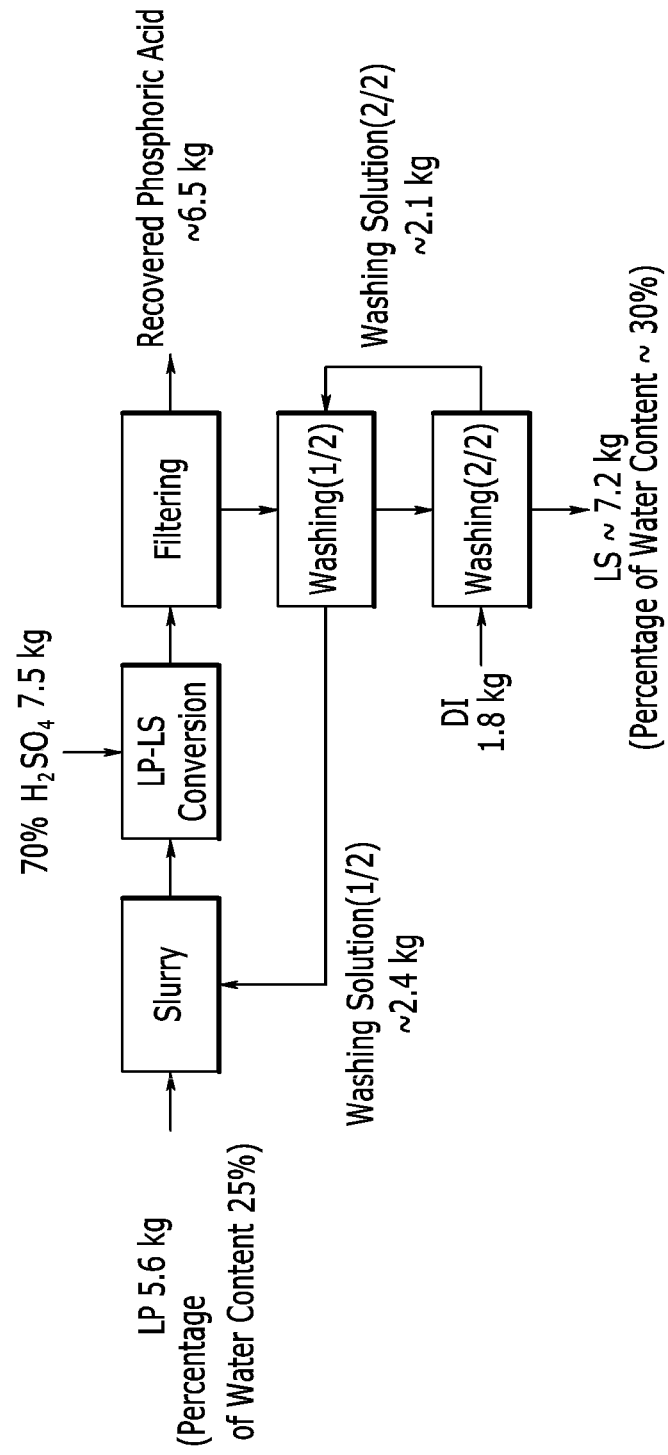
FIG. 12 exemplarily shows a process of obtaining washed solid-phase lithium sulfate from lithium phosphate.

FIG. 12 shows a process of obtaining a solid-phase lithium sulfate washed from lithium phosphate.

Lithium sulfate was manufactured through a solid/liquid separation after reacting lithium phosphate and sulfuric acid under a condition shown in FIG. 12. Lithium phosphate was lithium phosphate extracted from a brine, and components of the lithium phosphate were measured through ICP (Inductively Coupled Plasma) and shown in Table 23.

TABLE 23

| Li | K | Ca | Na | B | Mg | P | Ni | Other elements |
|---|---|---|---|---|---|---|---|---|
| 17.35 | 0.0009 | 0.031 | 0.90 | 0.090 | 0.022 | 25.05 | 0.0006 | <0.0005 |

However, units omitted in Table 23 are g/L.

A part of a primary washing solution obtained from the former batch was used as a solvent for making the lithium phosphate into slurry, and then, the solvent was mixed with the solid-phase lithium phosphate in a reactor, and sulfuric acid was added to slurry obtained therefrom while the slurry was stirred at 200 rpm.

Herein, the sulfuric acid was added at a speed of about 1 kg/min.

When the addition of the sulfuric acid was complete, the reactant slurry was additionally stirred for about 40 minutes and then, solid/liquid-separated through a filtration under a reduced pressure, and the pressure during the filtration was about 50 mbar.

A solid cake after the solid/liquid separation was washed in two primary and secondary washing steps. Herein, the secondary washing process was performed by using ultrapure water, and the primary washing process was performed by using a secondary washing solution recovered from the secondary washing process in the former cycle.

The recovered solid-phase lithium sulfate was component-analyzed by using ICP after dried at 105° C. for 24 hours, and the results are shown in Table 24.

TABLE 24

| | Components (wt. %) | | | | | | | | | |
|---|---|---|---|---|---|---|---|---|---|---|
| | Li | K | Ca | Ni | B | S | Mg | Na | P | Other elements |
| Preparation Example 1 | 12.89 | <0.0005 | <0.0005 | <0.0005 | <0.0005 | 29.53 | <0.0005 | 0.0017 | 0.24 | <0.0005 |
| Preparation Example 2 | 12.57 | <0.0005 | 0.0005 | <0.0005 | 0.0016 | 29.15 | <0.0005 | 0.011 | 0.66 | <0.0005 |
| Preparation Example 3 | 11.89 | <0.0005 | 0.0042 | <0.0005 | 0.0046 | 28.65 | 0.0010 | 0.033 | 1.34 | <0.0005 |
| Preparation Example 4 | 11.85 | <0.0005 | 0.0080 | <0.0005 | 0.0053 | 27.76 | 0.0009 | 0.036 | 1.20 | <0.0005 |
| Preparation Example 5 | 12.60 | <0.0005 | 0.0025 | <0.0005 | <0.0005 | 29.07 | <0.0005 | 0.0012 | 0.30 | <0.0005 |

Referring to Table 24, as for the lithium sulfates according to Preparation Examples 1 to 5, impurities such as K, Na, Mg, B, Ni, and the like were greater than or equal to 95% removed, and ca was greater than or equal to 50% removed.

Example 9

A lithium hydroxide aqueous solution was prepared by using a lithium sulfate aqueous solution as a raw material and a bipolar electrodialysis.

Specifically, a solid-phase lithium sulfate was manufactured according to the same method as Preparation Examples 1 to 5 by using lithium phosphate in Table 23.

The solid-phase lithium sulfate was dissolved in ultrapure water, and then, the obtained lithium sulfate aqueous solution having a lithium (Li) concentration of 20 g/L was component-analyzed by using ICP, and the results are shown in Table 25.

TABLE 25

| | Components (g/L) | | | | | | | | | |
|---|---|---|---|---|---|---|---|---|---|---|
| | Li | K | Ca | Ni | B | S | Mg | Na | P | Other elements |
| Lithium sulfate aqueous solution | 20.93 | 0.003 | 0.004 | <0.003 | 0.013 | 51.23 | <0.003 | 0.109 | 2.86 | <0.003 |

This prepared lithium sulfate aqueous solution was converted into a lithium hydroxide aqueous solution by using a bipolar electrodialysis. The lithium hydroxide aqueous solution and the recovered sulfuric acid solution and desalted solution were component-analyzed by using ICP, and the results are shown in Table 4.

TABLE 26

| Components (g/L) | LiOH solution | $H_2SO_4$ solution | Desalted solution |
|---|---|---|---|
| Li | 23.44 | 1.17 | 0.101 |
| K | 0.082 | 0.003 | <0.003 |
| Ca | 0.008 | 0.014 | <0.003 |
| B | 0.003 | 0.003 | 0.007 |
| S | 1.2 | 51.88 | 0.192 |
| Na | 0.183 | 0.047 | <0.003 |
| P | <0.003 | 1.46 | 1.1 |
| Other elements | <0.003 | <0.003 | <0.003 |

The lithium hydroxide aqueous solution prepared through the bipolar electrodialysis was crystallized through a concentration under vacuum and a reduced pressure to manufacture a $LiOHH_2O$ cake, and the cake was washed with ultrapure water which is the same amount of the weight of the cake and then, dried at a low temperature to prepare $LiOHH_2O$ powder. The prepared $LiOHH_2O$ powder was component-analyzed by using ICP, and the results are shown in Table 27.

TABLE 27

| | Components (wt. %) | | | | | |
|---|---|---|---|---|---|---|
| | Li | Ca | S | Na | Mg | Other elements |
| $LiOHH_2O$ | 26.59 | <0.0005 | 0.0023 | <0.0005 | <0.0005 | <0.0005 |

Referring to Tables 23 and 25, in a solid-phase lithium sulfate obtained through conversion of lithium phosphate into lithium sulfate according to an example embodiment of the present invention, impurities such as K, Na, Mg, B, Ni, and the like, which were present in the lithium phosphate, were greater than or equal to 95% removed, and Ca was greater than or equal to 50% removed.

In addition, referring to Table 26, impurities such as P, Ca, and the like which were present in a part of the lithium sulfate were removed, and referring to Table 27, impurities in $LiOHH_2O$ powder washed with an extremely small amount of ultrapure water, which is the same amount of the cake, were removed well enough to be used as a lithium compound for a rechargeable lithium battery.

Accordingly, cation impurities except for lithium were primarily purified in a process of washing the separated solid-phase lithium sulfate after converted from the lithium phosphate. In addition, a small amount of cation impurities remaining after the primary purification was secondarily purified through a bipolar electrodialysis process and thus recovered into lithium hydroxide with high purity.

A lithium compound (e.g., lithium carbonate) converted from the recovered lithium hydroxide and the recovered lithium hydroxide includes a small amount of impurities and thus may be applied to a rechargeable lithium battery through no or least washing process and resultantly, remarkably improve economic feasibility.

Example 10

(1) Conversion into Lithium Sulfate and Conversion into Lithium Hydroxide

Figure 14:
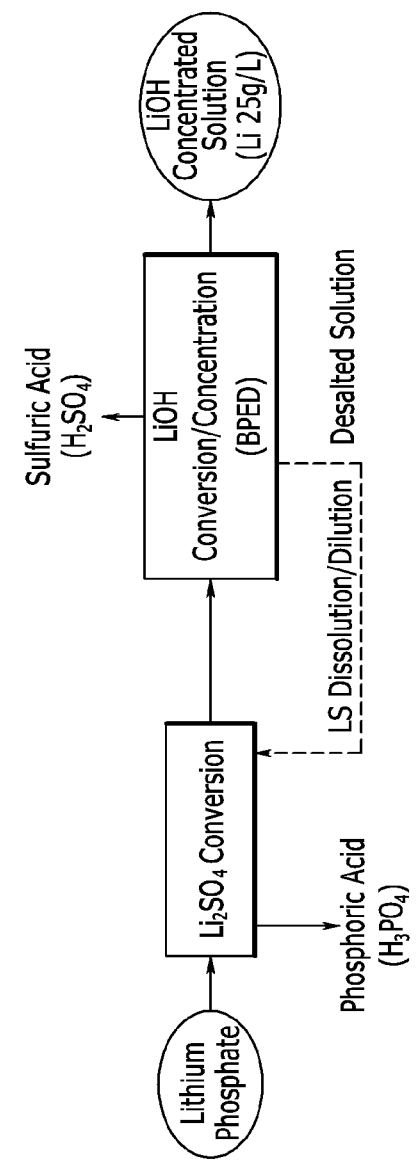
FIG. 14 exemplarily shows conversion of lithium phosphate into lithium sulfate and conversion into lithium hydroxide using a bipolar electrodialysis device (BPED) during the process of Example 10.

FIG. 14 exemplarily shows conversion of lithium phosphate into lithium sulfate and into lithium hydroxide by using a bipolar electrodialysis device (BPED) during the process of Example 10.

Specifically, a solid-phase lithium sulfate was separated by mixing lithium phosphate and sulfuric acid and converting lithium phosphate into sulfuric acid through a reaction in the mixture. Then, the solid-phase lithium sulfate was dissolved in a desalted solution produced from a bipolar electrodialysis device in the former batch and then, converted into lithium hydroxide through a bipolar electrodialysis.

As for a condition shown in FIG. 14, a lithium sulfate aqueous solution was prepared by dissolving lithium sulfate in a desalted solution.

Components of the desalted solution are shown in Table 28, and components of the lithium sulfate aqueous solutions (LS solutions) of Samples 1 to 5 are shown in Table 29. Each component was measured through ICP (Inductively Coupled Plasma).

Accordingly, when the desalted solution was used to dissolve the solid-phase lithium sulfate to obtain the lithium sulfate aqueous solution, a lithium recovery rate was increased by recovering lithium remaining in the desalted solution with a sulfuric acid solution.

The prepared lithium sulfate aqueous solution was diluted by using the same desalted solution and ultrapure water and then, converted into lithium hydroxide by using the bipolar electrodialysis device. The lithium sulfate aqueous solution (a LS raw solution), the lithium hydroxide aqueous solution (base), sulfuric acid (acid), and the desalted solution (salt) put in the bipolar electrodialysis device were component-analyzed through ICP (Inductively Coupled Plasma), and the results are shown in Table 30.

TABLE 30

|  | Li | S | P | Ca | Mg | Na | K | Other |
|---|---|---|---|---|---|---|---|---|
| LS raw solution | 12.790 | 30.730 | 0.629 | <0.003 | 0.004 | 0.083 | 0.007 | <0.003 |
| H₂SO₄ (Acid) | 0.318 | 43.623 | 0.417 | <0.003 | <0.003 | 0.005 | <0.003 | <0.003 |
| LiOH (Base) | 24.176 | 0.518 | <0.003 | <0.003 | <0.003 | 0.156 | 0.008 | <0.003 |
| Desalted solution (Salt) | 2.135 | 5.798 | 0.478 | <0.003 | 0.010 | 0.006 | <0.003 | <0.003 |

In Table 30, omitted units are g/L.

Referring to Table 30, when a lithium sulfate aqueous solution was prepared by using a desalted solution produced from the bipolar electrodialysis device in the former batch and then, converted into lithium hydroxide, lithium in the lithium hydroxide aqueous solution was included in an amount of 24.176 g/L. Accordingly, a process of FIG. 14 of recovering again lithium in the desalted solution as a component of the converted lithium hydroxide aqueous solution was successfully performed.

(2) Impurity Removal of Lithium Sulfate Aqueous Solution

Components of the lithium sulfate aqueous solution prepared according to the process shown in FIG. 14 depending

TABLE 28

|  | Li | S | P | Ca | Mg | Na | B | Fe | Ni | Cr | K | Al | Mn | Other |
|---|---|---|---|---|---|---|---|---|---|---|---|---|---|---|
| Desalted solution | 1.62 | 4.36 | 0.319 | <0.003 | 0.009 | 0.004 | <0.003 | <0.003 | <0.003 | <0.003 | <0.003 | <0.003 | <0.003 | <0.003 |

In Table 28, omitted units are g/L.

TABLE 29

|  | Li | S | P | Ca | Mg | Na | B | Fe | Ni | Cr | K | Al | Mn | Other |
|---|---|---|---|---|---|---|---|---|---|---|---|---|---|---|
| LS solution sample 1 | 33.77 | 80.03 | 1.99 | <0.003 | 0.008 | 0.14 | <0.003 | 0.008 | <0.003 | <0.003 | <0.003 | <0.003 | <0.003 | <0.003 |
| LS solution sample 2 | 33.96 | 80.42 | 1.9 | <0.003 | 0.008 | 0.133 | <0.003 | 0.008 | <0.003 | <0.003 | <0.003 | <0.003 | <0.003 | <0.003 |
| LS solution sample 3 | 33.92 | 80.76 | 2.04 | <0.003 | 0.008 | 0.136 | <0.003 | 0.007 | <0.003 | <0.003 | <0.003 | <0.003 | <0.003 | <0.003 |
| LS solution sample 4 | 34.01 | 80.3 | 1.85 | <0.003 | 0.008 | 0.121 | <0.003 | 0.006 | <0.003 | <0.003 | <0.003 | <0.003 | <0.003 | <0.003 |
| LS solution sample 5 | 33.87 | 80.51 | 2.54 | <0.003 | 0.008 | 0.16 | <0.003 | 0.009 | 0.003 | 0.003 | <0.003 | <0.003 | <0.003 | <0.003 |

In Table 29, omitted units are g/L.

The desalted solution included 1.62 g/L of lithium, 4.36 g/L of sulfur (S), and 0.314 g/L of phosphorus (P), and a small amount of sodium (Na) was detected. The lithium sulfate aqueous solution prepared by using the desalted solution included about 34 g/L of lithium.

on a pH change were measured through ICP (Inductively Coupled Plasma), and the results are shown in Table 31. Herein, pH of the lithium sulfate aqueous solution was adjusted by adding the lithium hydroxide aqueous solution obtained from the bipolar electrodialysis device used in the former batch.

TABLE 31

Components (g/L) of LS solution after pH adjustment

| pH | Li | S | P | Ca | Mg | Na | K | B |
|---|---|---|---|---|---|---|---|---|
| 6.5 | 30.88 | 71.28 | 0.074 | 0.007 | 0.036 | 0.218 | 0.010 | 0.003 |
| 7 | 28.96 | 68.17 | 0.039 | 0.004 | 0.034 | 0.199 | 0.006 | 0.003 |
| 7.5 | 30.21 | 70.11 | 0.017 | 0.004 | 0.035 | 0.207 | 0.006 | 0.003 |
| 8 | 29.26 | 68.81 | 0.023 | 0.004 | 0.035 | 0.207 | 0.006 | <0.003 |
| 8.5 | 30.25 | 69.85 | 0.006 | 0.003 | 0.034 | 0.207 | 0.006 | <0.003 |
| 9 | 29.91 | 68.91 | 0.009 | 0.003 | 0.035 | 0.210 | 0.006 | <0.003 |
| 9.5 | 29.55 | 68.89 | 0.006 | 0.003 | 0.034 | 0.210 | 0.006 | <0.003 |
| 11.5 | 29.51 | 68.90 | <0.003 | 0.003 | <0.003 | 0.220 | 0.006 | <0.003 |

The lithium sulfate aqueous solution had pH of 2.5 or so and included impurities such as a considerable amount of phosphorus (P), magnesium (Mg), and the like. An amount of the impurities may be changed depending on a preparation process of lithium sulfate and purity of the added lithium phosphate.

Referring to Table 31, when pH of the lithium sulfate aqueous solution was adjusted into 10 or higher, divalent or higher cation impurities such as phosphorus (P), magnesium (Mg), and the like were removed down to an amount of less than or equal to 0.003 g/L. Accordingly, the lithium sulfate aqueous solution was adjusted to have pH of greater than or equal to 10 to remove impurities and thus obtain a high purity lithium sulfate aqueous solution.

On the other hand, pH of the lithium sulfate aqueous solution may be adjusted by adding an alkali lithium aqueous solution such as lithium hydroxide and the like. Accordingly, in the present embodiment, pH of the lithium sulfate aqueous solution may be easily adjusted into greater than or equal to 10 by using the lithium hydroxide aqueous solution obtained from the bipolar electrodialysis device or the crystallization filtrate obtained form the crystallization process of the lithium hydroxide aqueous solution as an alkali lithium aqueous solution without adding a separate alkali solution.

Subsequently, the lithium sulfate aqueous solution purified through the pH adjustment into 10 or higher was diluted with ultrapure water and then, converted into lithium hydroxide by using the bipolar electrodialysis device. The lithium sulfate aqueous solution (LS raw solution) and the prepared lithium hydroxide aqueous solution (Base) put in the bipolar electrodialysis device, sulfuric acid (Acid), and a desalted solution (Salt) were component-analyzed by using ICP (Inductively Coupled Plasma), and the results are shown in Table 32.

TABLE 32

| | Li | S | P | Ca | Mg | Na | K | Others |
|---|---|---|---|---|---|---|---|---|
| LS raw solution | 12.45 | 29.67 | <0.003 | <0.003 | <0.003 | 0.078 | <0.003 | <0.003 |
| H$_2$SO$_4$ (Acid) | 0.484 | 50.8 | <0.003 | <0.003 | <0.003 | 0.006 | <0.003 | <0.003 |
| LiOH (Base) | 22.08 | 0.69 | <0.003 | <0.003 | <0.003 | 0.137 | 0.004 | <0.003 |
| Desalted solution (Salt) | 0.726 | 2.04 | <0.003 | <0.003 | <0.003 | <0.003 | <0.003 | <0.003 |

In Table 32, omitted units are g/L.

Referring to Table 32, when the lithium sulfate aqueous solution purified through the pH adjustment was converted into a lithium hydroxide solution by using the bipolar electrodialysis device, a concentration of phosphorus (P) and divalent or higher cation impurities in sulfuric acid and a desalted solution produced therewith was less than or equal to 0.003 g/L.

On the other hand, when the divalent or higher cation impurities were present in the lithium sulfate aqueous solution, a precipitate produced according to an operating condition of the bipolar electrodialysis device may be produced in the solution of the bipolar electrodialysis device. Herein, the precipitate may have a negative influence on a life-span of an ion exchange membrane in the bipolar electrodialysis device. Accordingly, the divalent cation impurities in the lithium sulfate aqueous solution added to the bipolar electrodialysis device need to be removed to stably perform the conversion process by using the bipolar electrodialysis device.

In addition, since phosphorus (P) remaining in the sulfuric acid aqueous solution and the desalted solution produced with the lithium hydroxide solution in the bipolar electrodialysis device was also removed, the sulfuric acid aqueous solution and the desalted solution may be reused in the next batch. Accordingly, productivity of a preparation process of a lithium compound may be remarkably improved.

Furthermore, when the sulfuric acid aqueous solution and the desalted solution produced in the bipolar electrodialysis device are released through a waste water treatment, a cost for the waste water treatment may be remarkably reduced, and thus economic feasibility may be improved.

(3) Preparation of Lithium Phosphate by Using Crystallization Filtrate and Recovered Phosphoric Acid A crystallization filtrate produced in a bipolar electrodialysis device may be used in a preparation process of lithium phosphate.

After converting the lithium phosphate into lithium sulfate, a filtrate remaining after separating the solid-phase lithium sulfate, high concentration phosphoric acid, may be recovered.

Referring to FIG. 14, the high concentration phosphoric acid and a crystallization filtrate were used to prepare a raw material, lithium phosphate, for a lithium compound preparation process according to the present example embodiment.

Herein, the crystallization filtrate produced in the bipolar electrodialysis device includes a filtrate produced during preparation of lithium hydroxide (LiOH·H$_2$O) by using a lithium hydroxide aqueous solution and a washing solution and in general, includes lithium of greater than or equal to 20 g/L.

A filtrate component and a lithium recovery rate depending on pH in the process of preparing lithium phosphate by using the crystallization filtrate and the recovered high concentration phosphoric acid filtrate are shown in Table 33.

TABLE 33

|  | pH | P amount (200 g/L) in recovered high concentration phosphoric acid filtrate (ml) | Li amount (24 g/L) of crystallization filtrate (ml) | 25% NaOH (ml) | Components of filtrate (g/L) | | | Li recovery rate |
|---|---|---|---|---|---|---|---|---|
|  |  |  |  |  | Li | P | Na |  |
| Recovered high concentration phosphoric acid filtrate + Crystallization filtrate | 6.5 | 66 | 455.5 | 0 | 3.36 | 0.761 | 1.41 | 84.9% |
|  | 7 | 66 | 470 | 0 | 3.09 | 0.283 | 1.38 | 86.1% |
|  | 7.5 | 66 | 474.5 | 0 | 2.97 | 0.144 | 1.37 | 86.7% |
|  | 8 | 66 | 472 | 0 | 2.84 | 0.055 | 1.36 | 87.3% |
|  | 8.5 | 66 | 475 | 0 | 2.76 | 0.033 | 1.33 | 87.6% |
|  | 9 | 66 | 475.7 | 0 | 2.74 | 0.017 | 1.32 | 87.7% |
|  | 9.5 | 66 | 475.5 | 0 | 2.74 | 0.012 | 1.32 | 87.7% |
| NaOH addition | 9.5 | 70 | 450 | 24.7 | 0.719 | 0.297 | >6.0 | 96.7% |
|  | 9.5 | 75 | 450 | 35.5 | 0.365 | 1.73 | >6.0 | 98.3% |

When the recovered high concentration phosphoric acid filtrate and the crystallization filtrate were used to extract lithium phosphate, about 87.7% of a lithium recovery rate was obtained at pH 9 or higher.

In addition, when a mixture of the recovered high concentration phosphoric acid filtrate and the crystallization filtrate was adjusted to have pH 9.5 by adding sodium hydroxide (NaOH) thereto, the lithium recovery rate was improved up to about 98%.

Herein, the lithium recovery rate is an amount of lithium recovered as lithium phosphate relative to an entire amount of lithium included in the recovered high concentration phosphoric acid and the crystallization filtrate. This lithium recovery rate may be changed depending on a lithium concentration of the recovered high concentration phosphoric acid and the crystallization filtrate.

Figure 15:
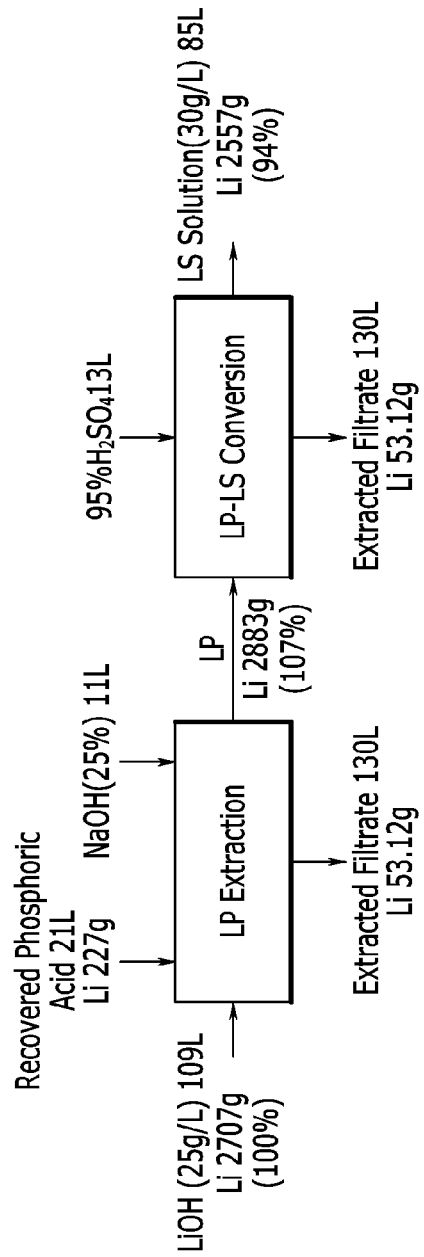
FIG. 15 exemplarily shows a process of preparing a lithium sulfate aqueous solution by converting lithium phosphate extracted using the recovered high concentration phosphoric acid filtrate and the crystallization filtrate, into lithium sulfate.

FIG. 15 shows a process of preparing a lithium sulfate aqueous solution through conversion of lithium phosphate extracted by using the recovered high concentration phosphoric acid and the crystallization filtrate into lithium sulfate as described above.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A method of preparing a lithium compound, comprising:
preparing a lithium phosphate;
mixing the lithium phosphate with sulfuric acid to obtain a mixture;
converting the lithium phosphate into lithium sulfate through a reaction in the mixture; and
separating the lithium sulfate in a solid phase,
wherein the step of converting the lithium phosphate into lithium sulfate through the reaction in the mixture, a sum concentration ([P+S] mol/L) of phosphorus (P) and sulfur (S) in a liquid phase of the mixture is 5.5 mol/L or more and 15 mol/L or less,
wherein in the step of mixing the lithium phosphate with the sulfuric acid to obtain the mixture and converting the lithium phosphate into lithium sulfate through the reaction in the mixture, a high concentration phosphoric acid solution is produced through a direct reaction of the lithium phosphate with the sulfuric acid, the high concentration phosphoric acid solution is a high-concentration phosphoric acid solution wherein sulfuric acid ions are present, and lithium which is present at a higher concentration than that which is soluble in the high concentration phosphoric acid solution wherein sulfuric acid ions are present is precipitated into lithium sulfate ($Li_2SO_4$),
wherein a concentration of phosphoric acid in the high concentration phosphoric acid solution is greater than or equal to 50 wt %,
wherein the step of mixing the lithium phosphate with sulfuric acid to obtain the mixture, the input amount of sulfuric acid is controlled so that the sum concentration ([P+S] mol/L) of phosphorus (P) and sulfur (S) in a liquid phase of the mixture is 5.5 mol/L or more and 15 mol/L or less,
wherein the step of separating the lithium sulfate in a solid phase further includes separating a solid-phase lithium sulfate and recovering a high concentration phosphoric acid filtrate,
wherein the recovered high concentration phosphoric acid filtrate is used for production of the lithium phosphate before the step of preparing the lithium phosphate,
wherein the step of preparing the lithium phosphate is preparing a solid-phase lithium phosphate in a slurry state in a solvent,
wherein the method includes washing the separated solid-phase lithium sulfate with water, and in a continuous process reusing the water used in the step of washing the separated solid-phase lithium sulfate with water as a solvent during the step of preparing the solid-phase lithium phosphate in a slurry state in a solvent, after the step of separating the lithium sulfate in a solid phase.

2. The method of preparing a lithium compound of claim 1, wherein the reaction in the step of converting the lithium phosphate into lithium sulfate through the reaction in the mixture includes a reaction of Reaction Scheme 1

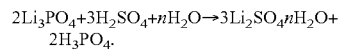
[Reaction Scheme 1]

3. The method of preparing a lithium compound of claim 1, wherein the step of preparing the lithium phosphate is preparing a solid-phase lithium phosphate in a slurry state in a solvent and the solvent is water or phosphoric acid.

4. The method of preparing a lithium compound of claim 1, wherein the recovered high concentration phosphoric acid filtrate is used as a solvent during the step of preparing the solid-phase lithium phosphate in a slurry state in a solvent.

5. The method of preparing a lithium compound of claim 1, wherein in the step of washing the separated solid-phase lithium sulfate, pure water (DI water) is used.

6. The method of preparing a lithium compound of claim 5, wherein the step of washing the separated solid-phase lithium sulfate uses water with an alcohol based solvent, and
the alcohol based solvent is recovered by distillation of the water including the alcohol based solvent and is reused in the step of washing the solid-phase lithium sulfate.

7. The method of preparing a lithium compound of claim 1, wherein
the method further includes
dissolving the separated solid-phase lithium sulfate in a solvent to prepare a lithium sulfate aqueous solution; and
converting the lithium sulfate aqueous solution into a lithium hydroxide aqueous solution, a desalted solution, and a sulfuric acid aqueous solution using an electrodialysis device including bipolar membranes.

8. The method of preparing a lithium compound of claim 7, wherein the method further includes carbonizing the converted lithium hydroxide to obtain lithium carbonate.

9. The method of preparing a lithium compound of claim 1, wherein the step of washing the separated solid-phase lithium sulfate uses pure water (DI water) and
includes washing the same twice or more.

10. The method of preparing a lithium compound of claim 1, wherein the method of preparing a lithium compound includes
using a whole of the $(n+1)^{th}$ washing water during $(n+2)^{th}$ washing;
reusing a part of $(n+2)^{th}$ washing obtained by $(n+2)^{th}$ washing as a solvent during the step of preparing the solid-phase lithium phosphate in a slurry state in a solvent; and
$(n+3)^{th}$ washing lithium sulfate with a mixture of the remaining part of the $(n+2)^{th}$ washing water with additional pure water.

* * * * *